Oct. 31, 1950  R. H. CLARK  2,528,299
MACHINE TOOL
Filed June 6, 1946  10 Sheets-Sheet 1
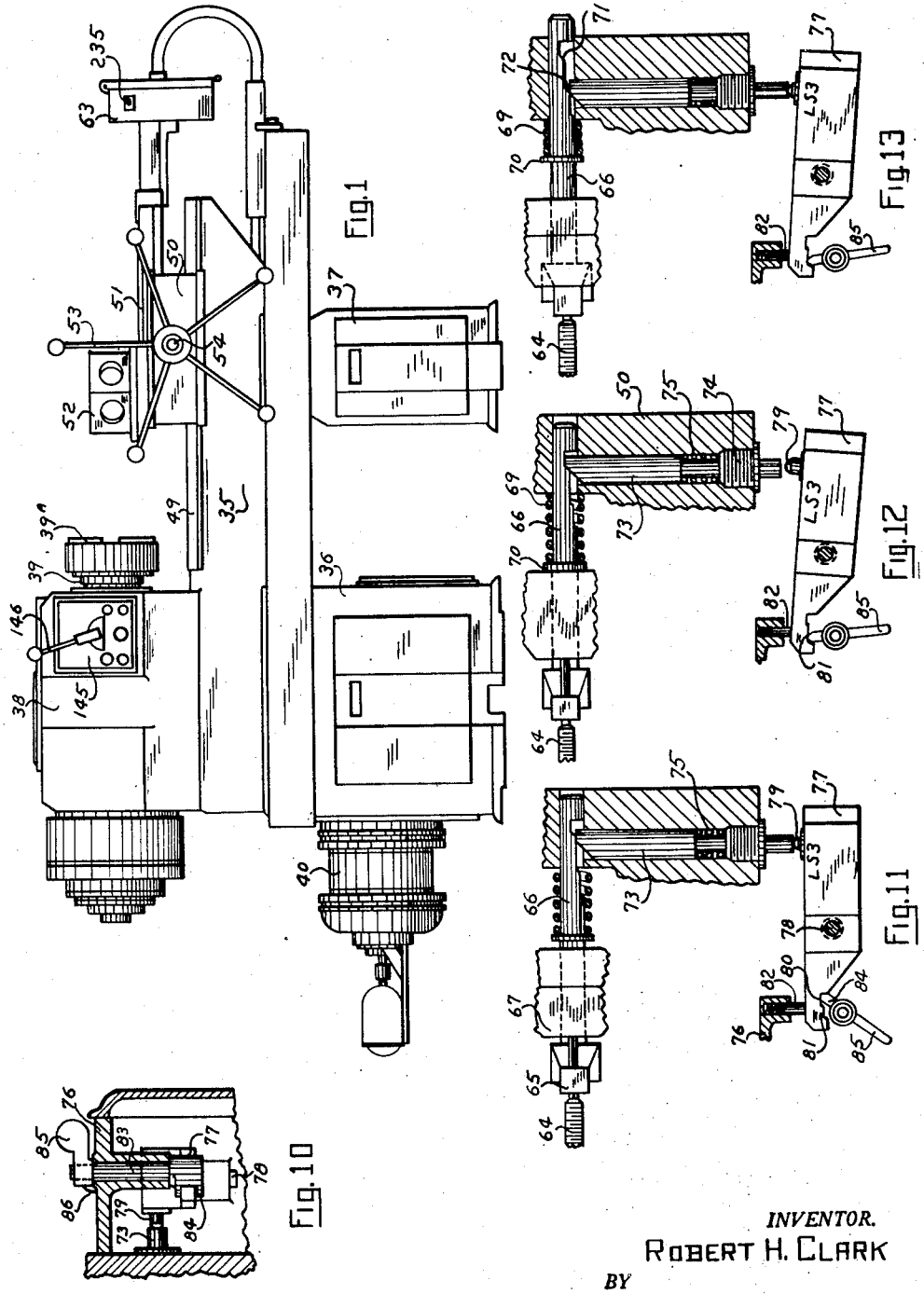
INVENTOR.
ROBERT H. CLARK
BY
Kwis, Hudson, Boughton & Williams
ATTORNEYS

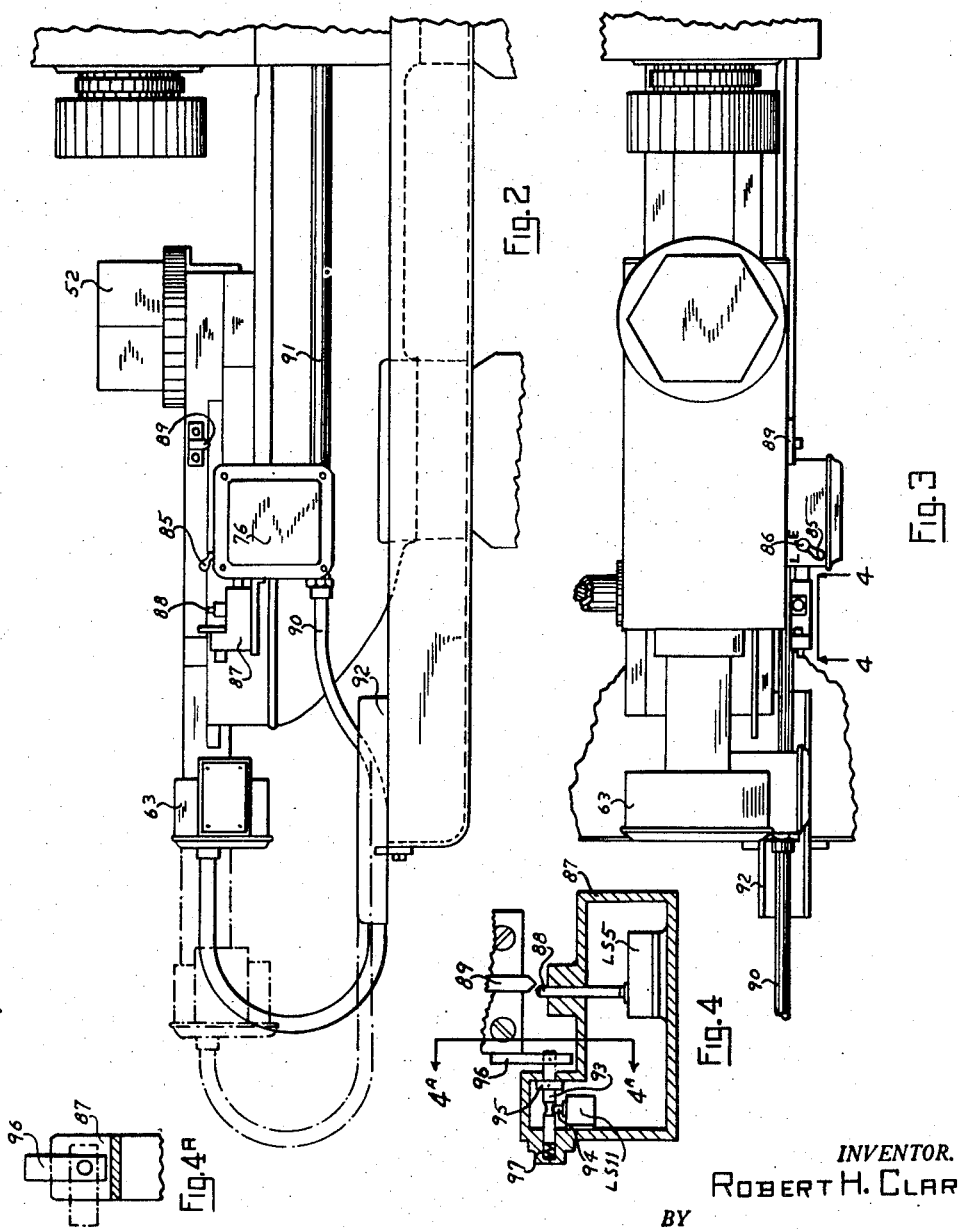

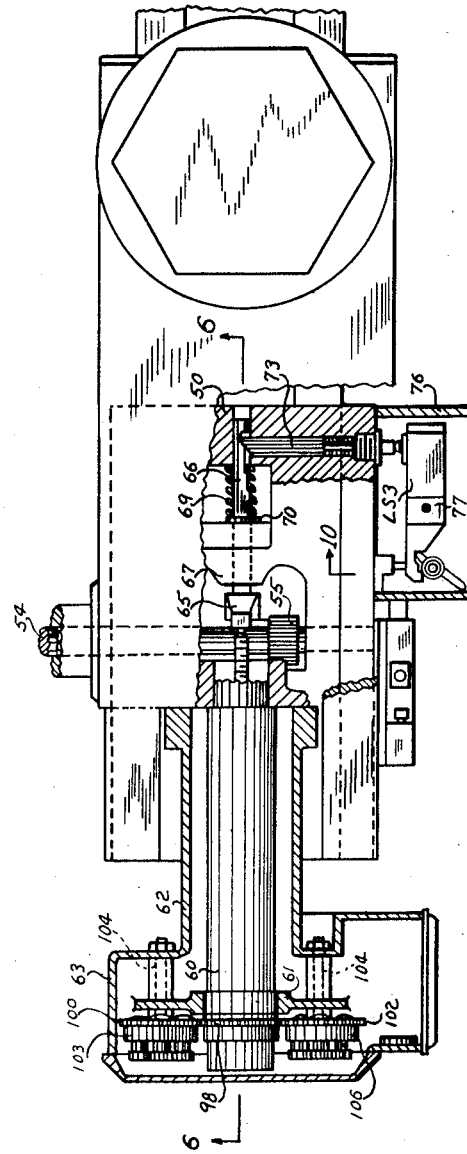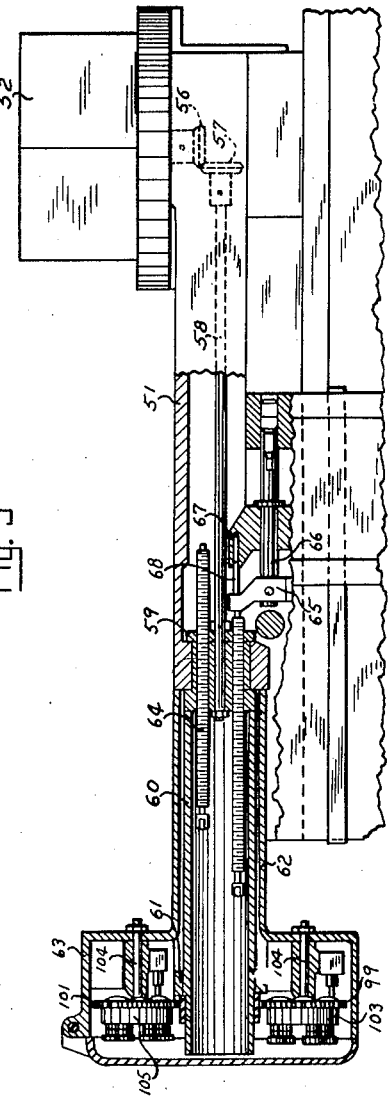

Oct. 31, 1950 R. H. CLARK 2,528,299
MACHINE TOOL
Filed June 6, 1946 10 Sheets-Sheet 4
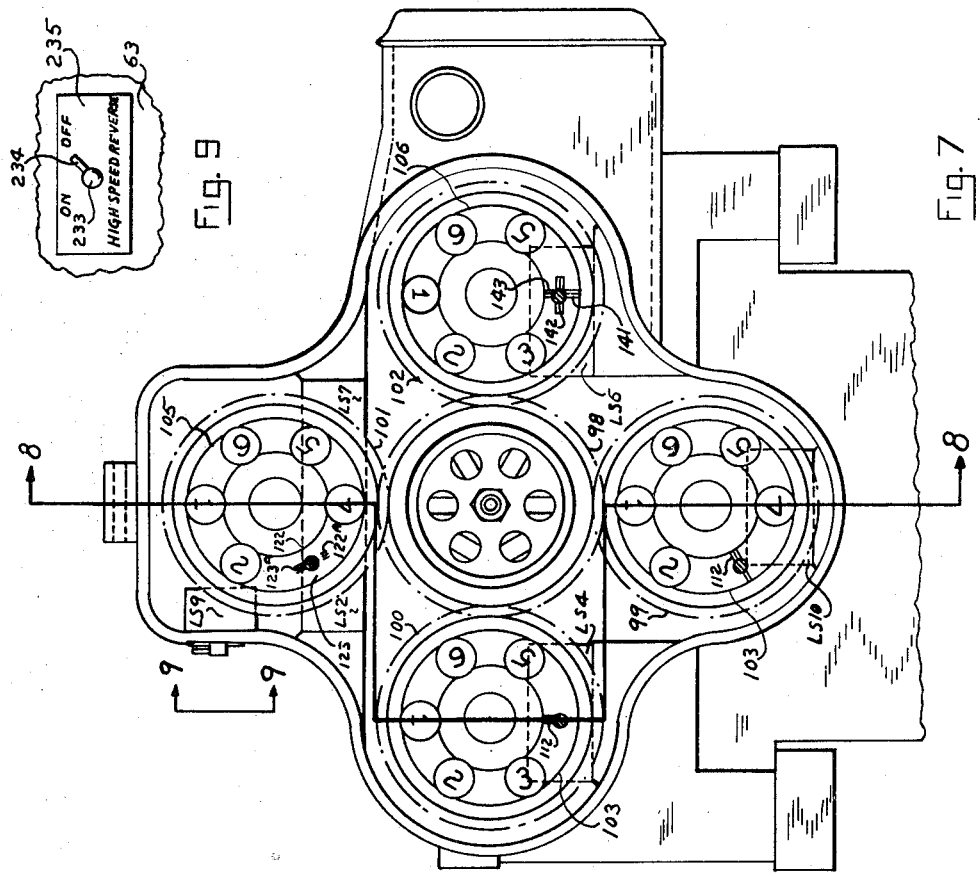
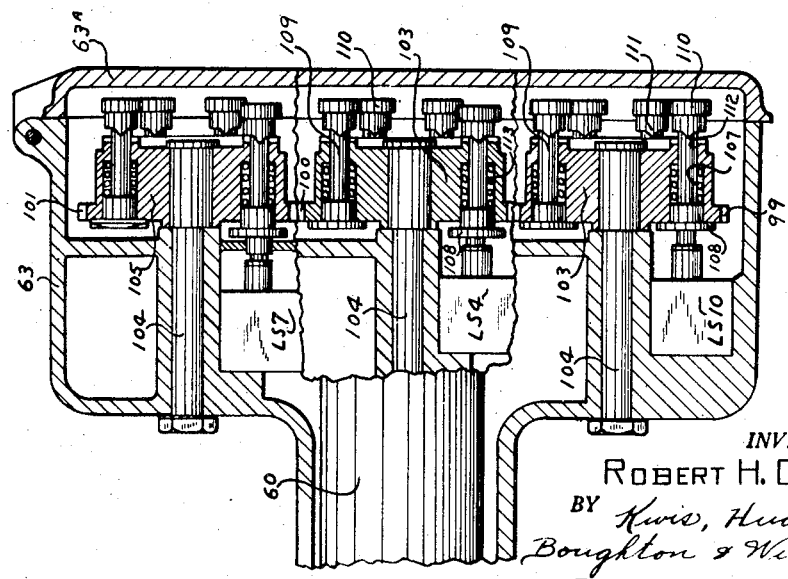
INVENTOR.
ROBERT H. CLARK
BY Kwis, Hudson,
Boughton & Williams
ATTORNEYS

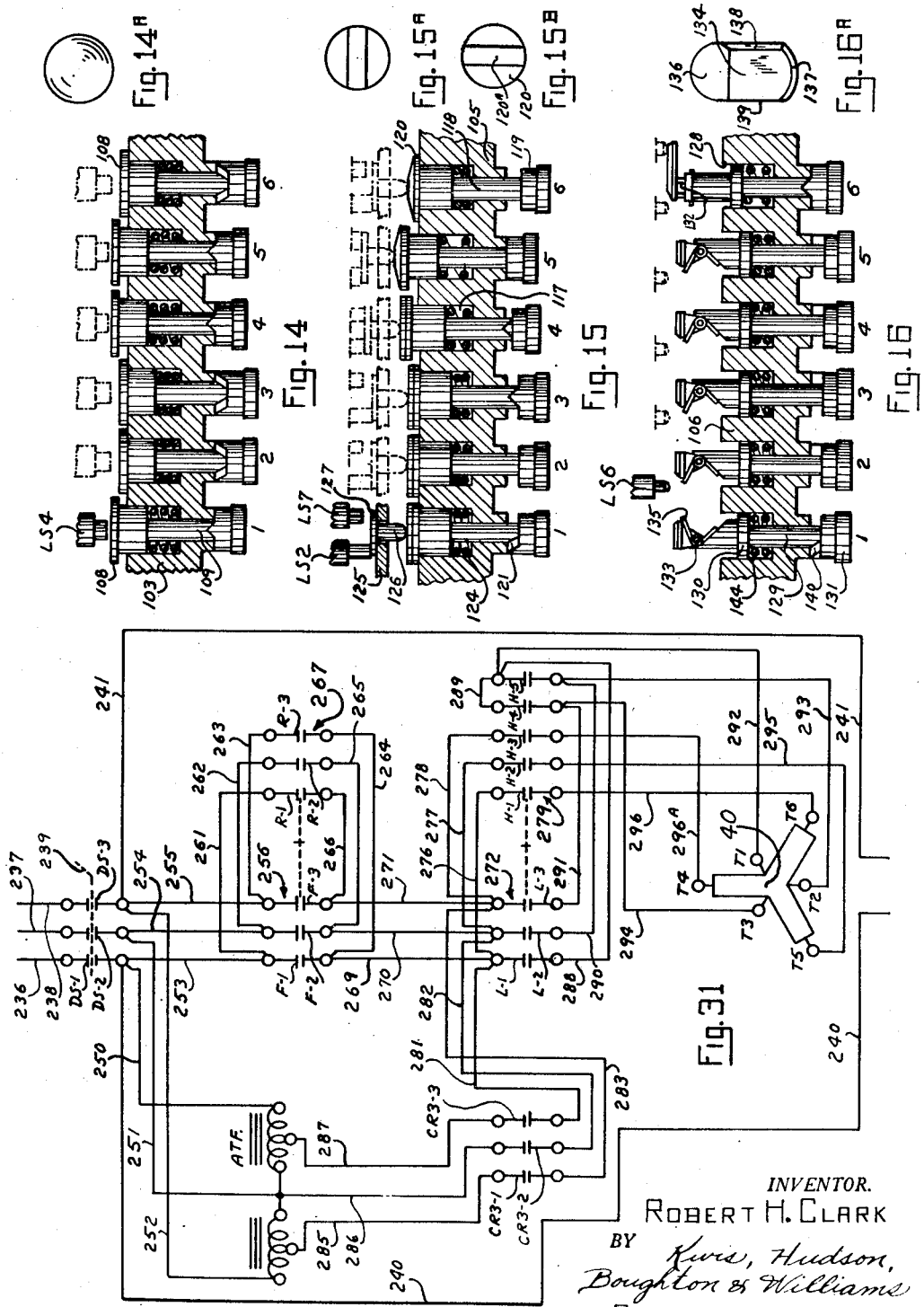

Oct. 31, 1950     R. H. CLARK     2,528,299
MACHINE TOOL
Filed June 6, 1946     10 Sheets-Sheet 6
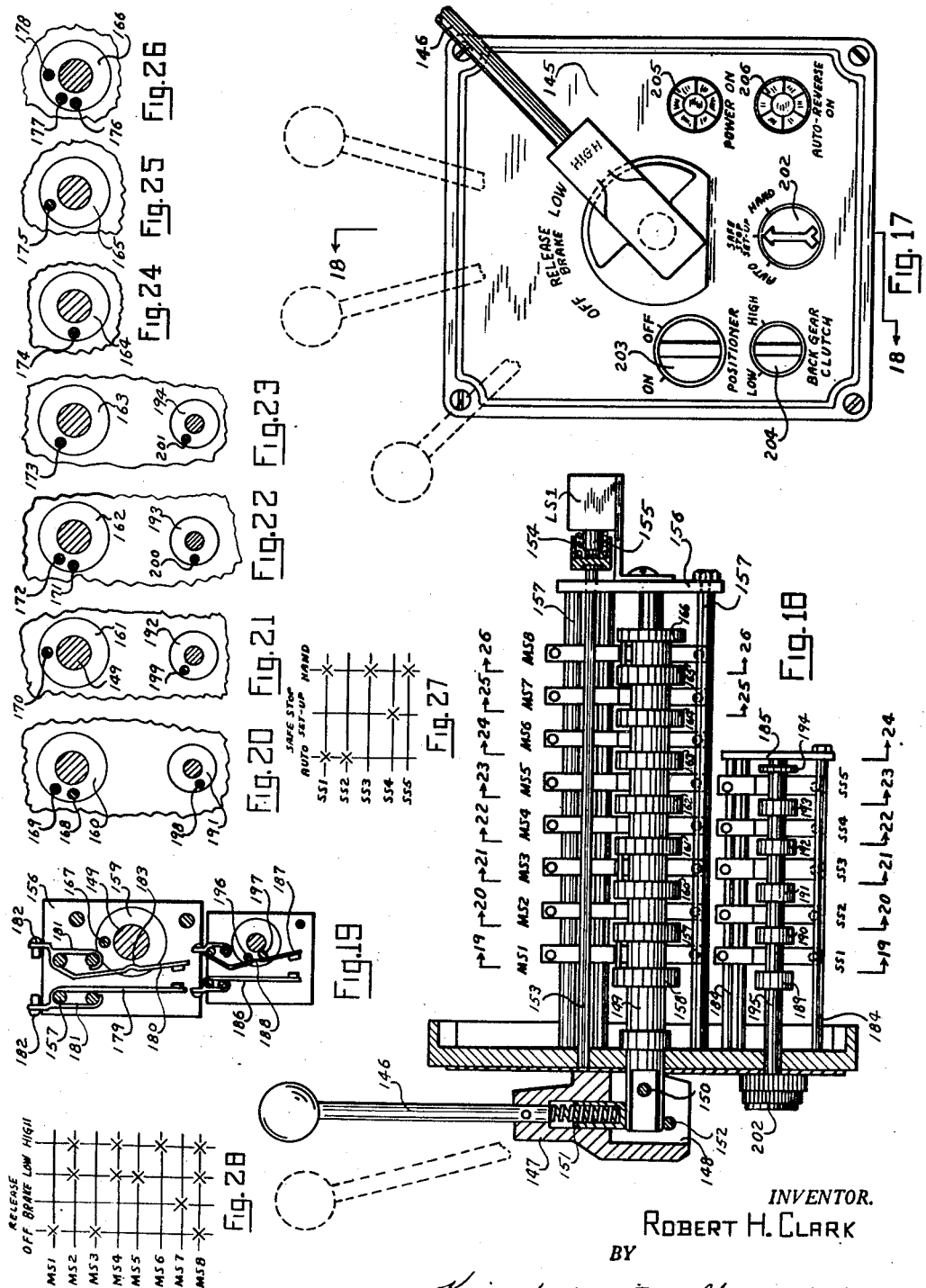
INVENTOR.
ROBERT H. CLARK
BY
Kwis, Hudson, Boughton & Williams
ATTORNEYS Oct. 31, 1950 R. H. CLARK 2,528,299
MACHINE TOOL
Filed June 6, 1946 10 Sheets-Sheet 7

INVENTOR.
ROBERT H. CLARK
BY
Kwis, Hudson, Boughton & Williams
ATTORNEYS

Oct. 31, 1950 — R. H. CLARK — 2,528,299
MACHINE TOOL
Filed June 6, 1946 — 10 Sheets-Sheet 10

INVENTOR.
ROBERT H. CLARK
BY
Kurie, Hudson, Boughton & Williams
ATTORNEYS

Patented Oct. 31, 1950

2,528,299

UNITED STATES PATENT OFFICE 2,528,299

MACHINE TOOL

Robert H. Clark, Solon, Ohio, assignor to The Warner & Swasey Company, Cleveland, Ohio, a corporation of Ohio Application June 6, 1946, Serial No. 674,894

15 Claims. (Cl. 29—64)

This invention relates to a machine tool and particularly to a machine tool adapted to perform rapid machining and threading operations upon relatively small work pieces, although the invention may be advantageously employed in machining tools for different types of work pieces.

Another object of the invention is to provide a machine tool which is so constructed and its operations so controlled that it will function in an improved, rapid and efficient manner and thus enable the work pieces to be more economically produced.

Another object of the invention is to provide a machine tool which is particularly suited for machining relatively small work pieces at high speeds and wherein a number of machining operations are to be performed upon each work piece successively, with each machining operation of relatively short duration, thereby requiring frequent changes in speed and direction of operation.

Another object of the invention is to provide in a machine tool of the type having an electric motor for driving the spindle at different speeds in opposite directions, improved means for controlling the speed and direction of motor operation.

A further object is to provide in a machine tool of the type having a variable speed spindle and a slide provided with an indexible turret, improved means for controlling the speeds, the direction of movement and the starting and stopping of the spindle and which means is actuated in part by the indexing of the turret and in part by the movements of the slide.

Another and important object is to provide in a machine tool of the type having a reversible multispeed electric motor for driving the spindle and a slide provided with an indexible turret, improved means for controlling the speeds, the direction of rotation and the starting and stopping of the motor for each step of a work cycle and which means can be preset and then actuated in part by the indexing of the turret and in part by the movement of the slide.

A still further object of the invention is to provide in a machine tool having in combination with the features above referred to improved means for braking the motor to stop the rotation of the spindle and for locating the spindle in a predetermined position for purposes of loading and unloading.

Another object is to provide in a machine tool in combination with the features hereinbefore enumerated, improved and novel means for causing the multispeed motor to drive the said spindle at different speed ranges, i. e., a high speed range and a low speed range, and which means is controlled by the indexing of the turret.

Further and additional objects and advantages not specifically referred to above will become apparent during the detailed description of an embodiment of the invention which is to follow.

Referring to the accompanying drawings illustrating said embodiment of the invention, Fig. 1 is a front elevational view of a machine tool to which the invention has been applied, the machine tool being shown for purposes of illustration as a turret lathe wherein the slide is manually moved and the turret is indexed by the movement of the slide.

Fig. 2 is a fragmentary rear elevational view of the machine tool shown in Fig. 1 but on a larger scale.

Fig. 3 is a fragmentary top plan view of the machine tool shown in Fig. 2.

Fig. 4 is a detached sectional view taken substantially on line 4—4 of Fig. 3 looking in the direction of the arrows.

Fig. 4a is a fragmentary elevational view taken substantially from line 4a—4a of Fig. 4.

Fig. 5 is a fragmentary view similar to Fig. 3 but on a larger scale and shows the construction of the machine tool partly in top plan and partly in section.

Fig. 6 is a rear view of the portion of the machine tool shown in Fig. 5 and is partly in elevation and partly in section, the section being taken substantially on line 6—6 of Fig. 5 looking in the direction of the arrows.

Fig. 7 is an end view on a larger scale taken from the left hand end of Figs. 5 and 6 and with the end cover plate removed.

Fig. 8 is a sectional view taken substantially on line 8—8 of Fig. 7 looking in the direction of the arrows.

Fig. 9 is a fragmentary front elevational view taken substantially from line 9—9 of Fig. 7, looking in the direction of the arrows.

Fig. 10 is a detached detail sectional view on a larger scale taken on line 10—10 of Fig. 5, looking in the direction of the arrows.

Fig. 11 is a detached view of a portion of the mechanism shown in Fig. 5 and is on a larger scale and with the parts shown in different relationship.

Fig. 12 is a view similar to Fig. 11 but shows the parts in a still different relationship.

Fig. 13 is a view similar to Figs. 11 and 12 but shows the parts in a still different relationship.

Fig. 14 is a developed view of the most left hand and of the lowermost cam disk carrying drums shown in Fig. 7, which drums are identical in construction.

Fig. 14a is a plan view of one of the cam disks of the drum shown in Fig. 14.

Fig. 15 is a developed view of the uppermost cam disk carrying drum shown in Fig. 7.

Figs. 15a and 15b are plan views of one of the cam disks of the drum shown in Fig. 15 and disclose two different operative positions of said disk.

Fig. 16 is a developed view of the most right hand cam disk carrying drum shown in Fig. 7.

Fig. 16a is a plan view of one of the cam disks of the drums shown in Fig. 16.

Fig. 17, Sheet 6, is a detached elevational view on a larger scale of the control panel shown in Fig. 1 with certain positions of the control lever indicated by dash lines.

Fig. 18 is a sectional view taken on line 18—18 of Fig. 17 looking in the direction of the arrows.

Fig. 19 is a detail sectional view taken substantially on line 19—19 of Fig. 18.

Figs. 20, 21, 22, 23, 24, 25 and 26 are sectional views taken, respectively, substantially on lines 20—20, 21—21, 22—22, 23—23, 24—24, 25—25 and 26—26 looking in the direction of the arrows.

Fig. 27 is a chart showing the relationship of the various SS switches on the control panel.

Fig. 28 is a chart showing the relationship of the various MS switches on the control panel.

Figure 29:
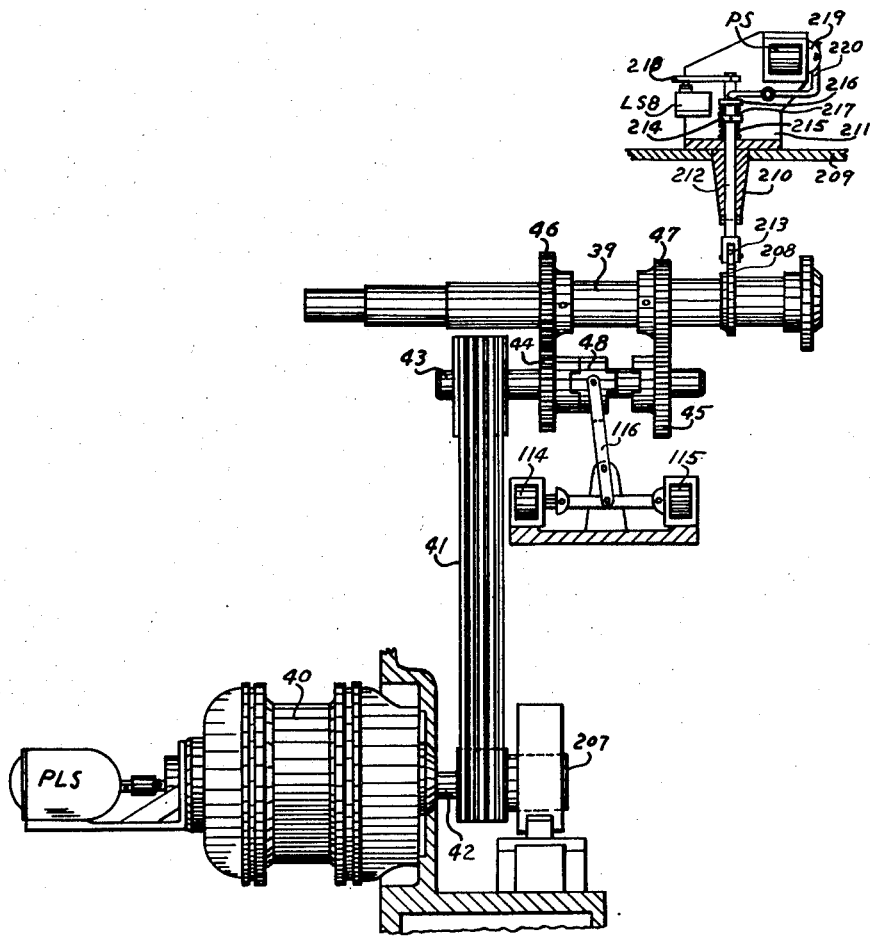

Fig. 29 is a detached elevational view of the spindle and drive therefor and includes a braking mechanism for the motor, a positioning mechanism for the spindle and mechanism for imparting high and low speed ranges to the spindle.

Figure 30:
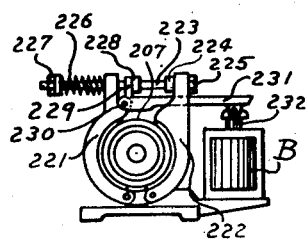

Fig. 30 is an end elevational view of the brake mechanism and is taken looking at the right hand end of a portion of Fig. 29.

Fig. 31 is a wiring diagram of the power circuits for the motor and the speed and direction controls therefor.

Figure 32:
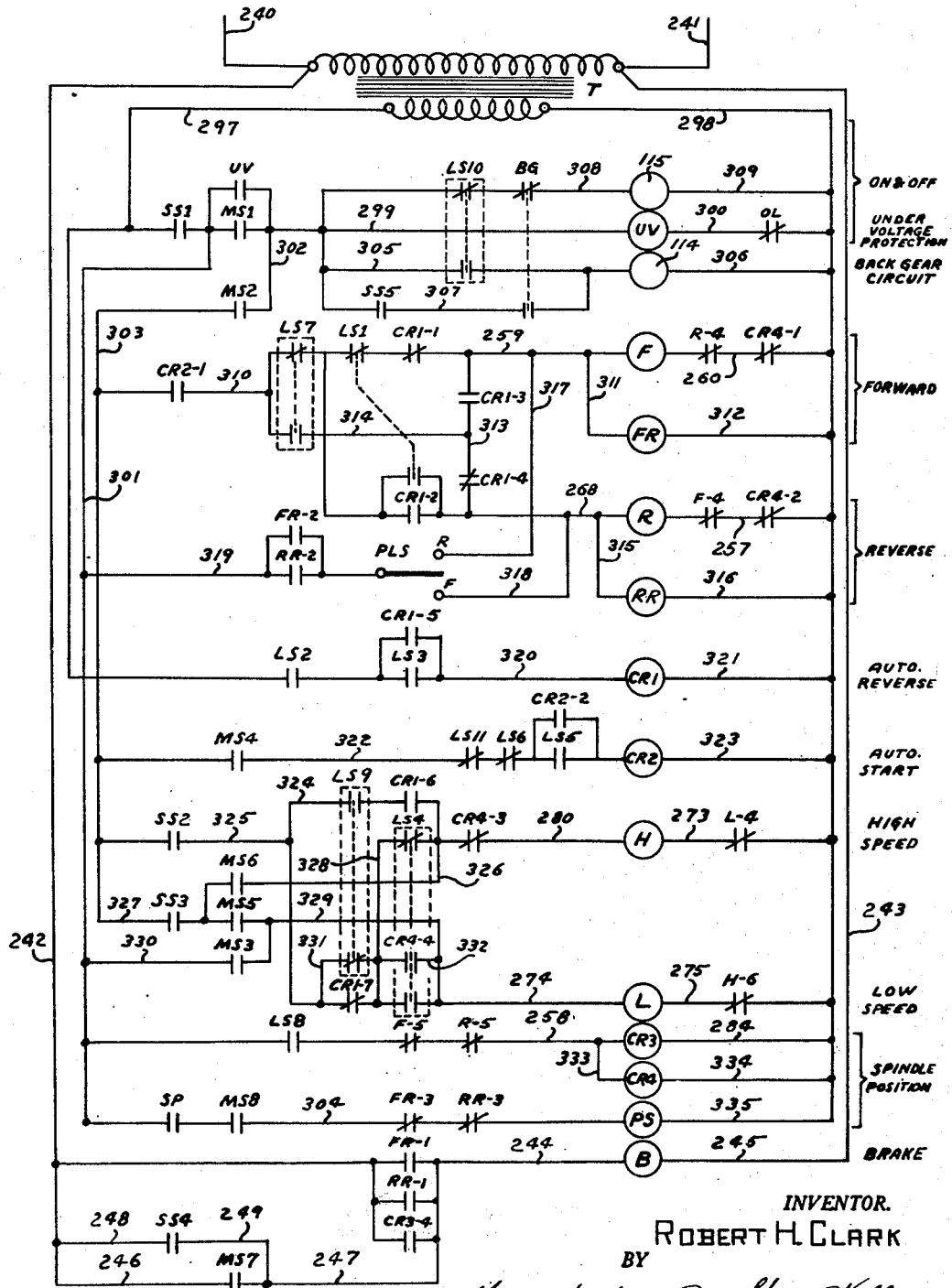

Fig. 32 is a wiring diagram of the electrical control circuits for the machine.

Figure 33:
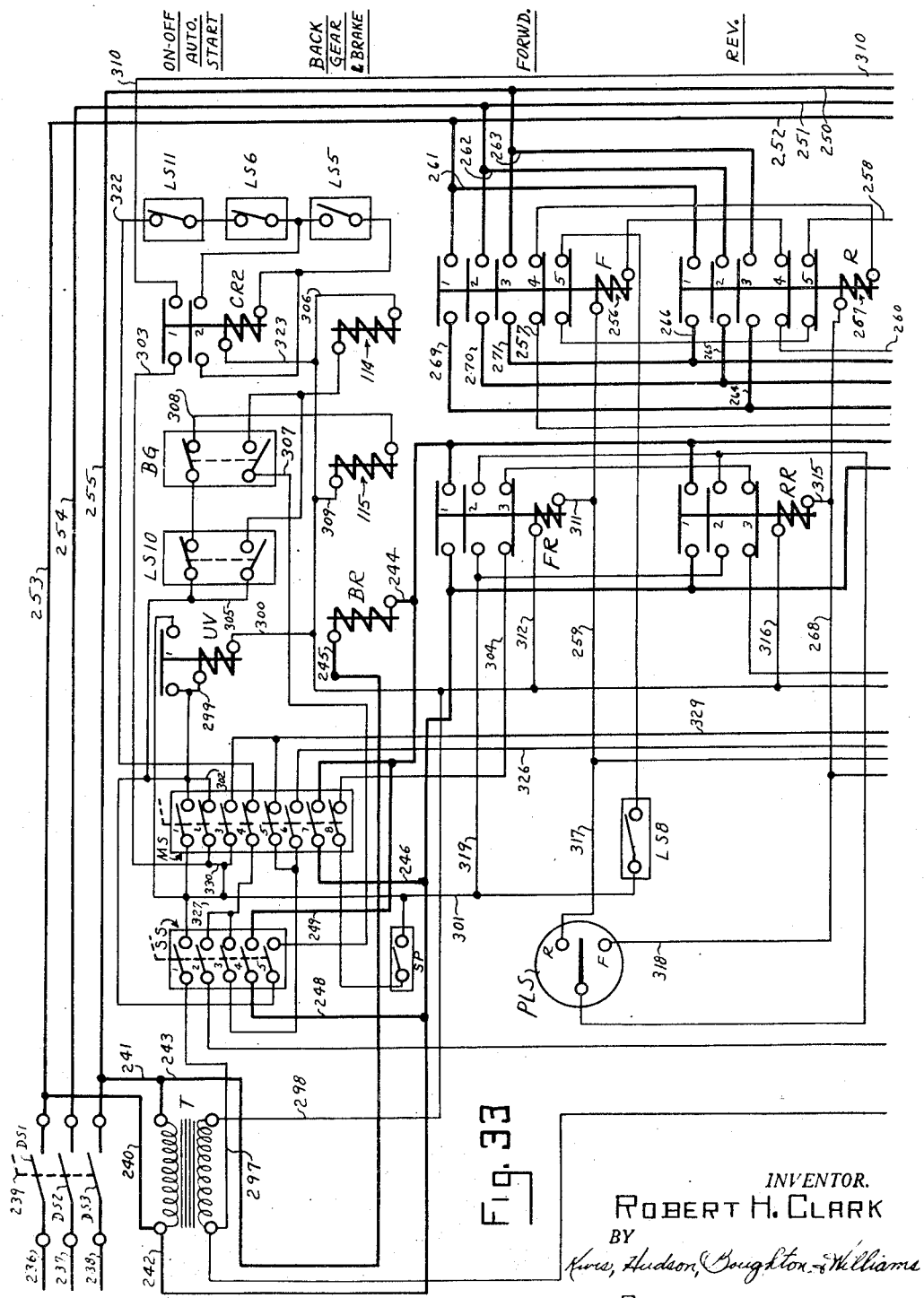
Figure 34:
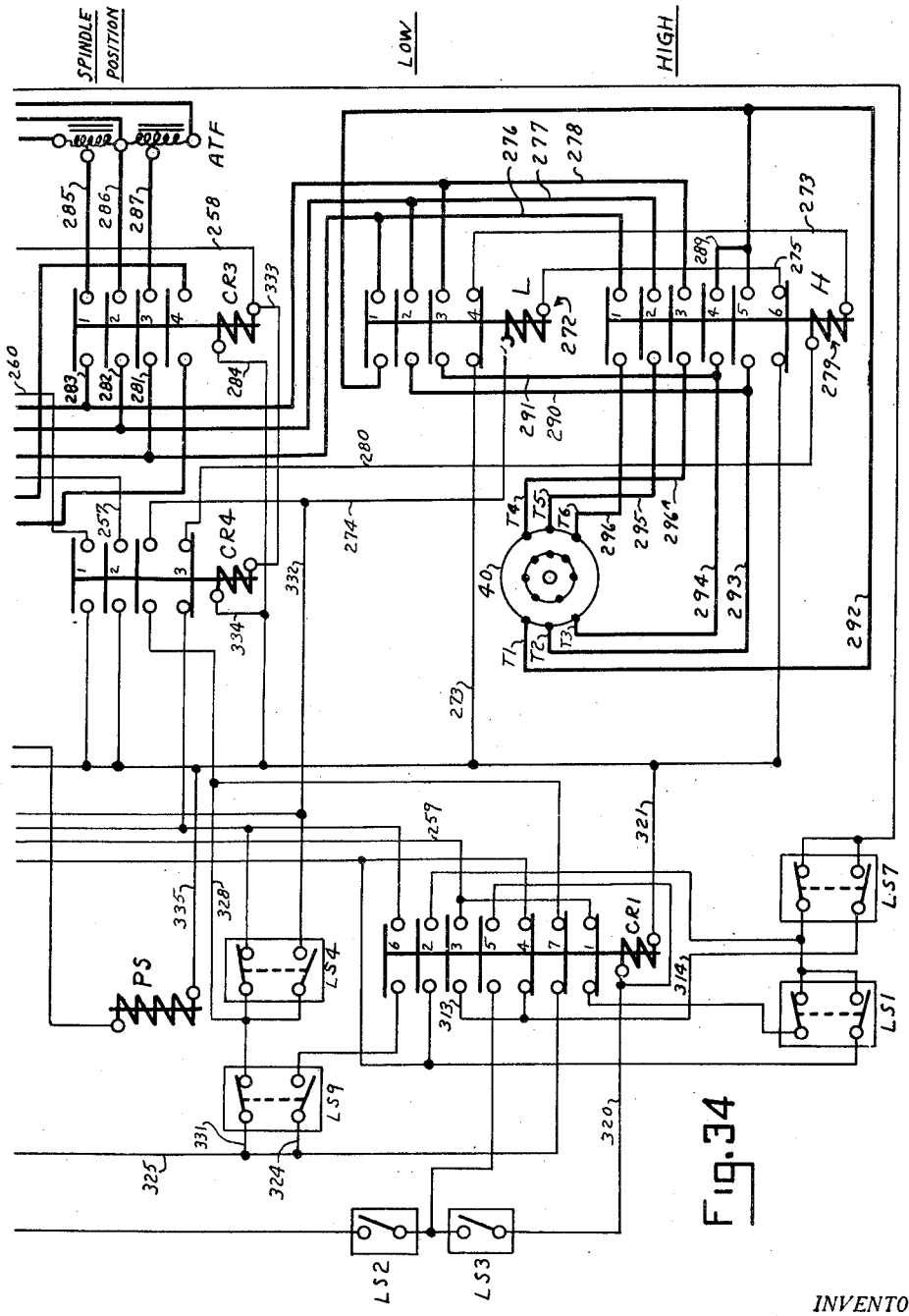

Figs. 33 and 34, taken together, are a wiring diagram of the electrical circuits for the machine corresponding with the power and control circuits disclosed in Figs. 31 and 32 but laid out in accordance with Patent Office standards and requirements.

Referring to Fig. 1, the machine tool shown therein is a turret lathe and comprises a bed 35 supported on spaced pedestals 36 and 37. A headstock 38 is carried by one end of the bed 35 and rotatably supports the work spindle 39 and chuck 39a and which spindle is driven by a reversible multispeed electric motor 40 supported by the pedestal 36 and operatively connected with the spindle 39 by means of belts 41 extending around a pulley on the motor shaft 42 and a pulley on a shaft 43, see Fig. 29. The shaft 43 carries gears 44 and 45 which are freely rotatable relative to the shaft and mesh, respectively, with a large gear 46 and a smaller gear 47 fixed to the spindle 39. The shaft 43 is provided with shiftable clutch means whereby the gear 44 or the gear 45 can be clutched to said shaft and for purposes of illustration said clutch means is shown herein as a positive clutch element 48 adapted to be shifted in either direction from a neutral position axially of the shaft 43 to a position where it is positively engaged with the gear 44 or to a position where it is positively engaged with the gear 45. The mechanism for shifting the clutch element 48 will be explained in detail hereinafter and it should be sufficient for the present to note that the multispeed motor 40 can drive the spindle 39 at a plurality of different speeds either in low speed range or in high speed range, depending upon which of the gears 44 or 45 is clutched to the shaft 43. The bed 35 is provided with longitudinally extending ways 49 which are parallel to the work spindle 39 and adjustably support a saddle 50 and on which is a turret slide 51 having an indexible turret 52, see Fig. 1. The saddle 50, in a manner well known in the art, can be moved to and clamped in adjusted position on the ways 49, while the slide 51 is manually moved on the ways of the saddle by means of a turnstile 53 fixed to a shaft 54 which carries a pinion 55, see Fig. 5, and is rotatably supported in the saddle with said pinion meshing with a rack carried by the slide as is well known in the art.

The turret 52 is indexed automatically by the movement of the slide and is locked and clamped by well known mechanism for that purpose and therefore not illustrated herein. The central stud of the indexible turret 52 extends into the slide 51 and has fixed thereto a bevel gear 56, see Fig. 6, which meshes with a bevel gear 57 fixed to one end of a shaft 58 that is parallel to the ways 49. The shaft 58 extends rearwardly within the slide 51 and passes through and is fixed to a stop roll collar 59. The collar 59 abuts against one side of a bearing boss formed in the slide 51 and said collar is rigidly connected to the end of a reduced portion of a stop roll 60 and which reduced portion rotatably interfits said bearing boss while the shoulder on the stop roll at the inner end of the reduced portion engages the opposite side of the bearing boss upon the collar 59, wherefore the stop roll is held against relative endwise movement with respect to the slide 51 but can rotate relative thereto.

The stop roll 60 rearwardly of the reduced portion thereof is in the form of a sleeve and the rear end of the stop roll is rotatably supported in a bearing boss 61 formed in a supporting bracket attached to the end of the slide and having a sleeve portion 62 surrounding the sleeve portion of the stop roll and an integral cam disk supporting drum housing portion 63 for a purpose later to be explained. The stop roll collar 59 is provided with a plurality of circularly spaced openings concentric to the shaft 58 and aligned with threaded bores formed in the reduced portion of the stop roll. Adjustable stop screws 64 extend through the threaded bores of the stop roll and through the openings in the collar 59 and can be adjusted longitudinally relatively to the stop roll by means of wrench heads formed on the stop screws within the sleeve portion of the stop roll. The stop screws will correspond in number to the different indexed positions of the turret and it will be noted that as the turret is indexed the stop roll will be simultaneously indexed through the bevel gears 56, 57 and the shaft 58 to bring the stop screws successively in line with a movable stop member 65.

The stop member 65 is fixed to a cam rod 66 which is slidably supported in a portion of the base and which portion is provided with a postive stop lug 67 against which the movable stop member 65 abuts after it has been moved by the stop screw which is in alignment therewith. The positive stop lug 67 is provided with a recess which slidably receives a pin 68 carried by the movable stop member 65, wherefore said member and the rod 66 are held against rocking movement about the axis of said rod.

It will be seen that when the slide 51 moves forwardly toward the chuck 39a carried by the work spindle 39 the movable stop member 65 will be engaged by one of the stop screws 64 when the slide approaches its limit of forward movement and during the remainder of the forward movement of the slide for non-threading operations the movable stop member 65 will be moved into engagement with the positive stop lug 67 and the forward movement of the slide thus positively arrested. This movement of the movable stop member 65 compresses the coil spring 69 which surrounds the rod 66 between a collar 70 fixed to the rod and a part of the saddle 50. The rod 66 has its right hand end as viewed in the drawings slidably supported in a bore formed in the saddle 50 for a purpose later to be pointed out. The cam rod 66 is provided with a stepped recessed cam portion for the purpose of controlling the automatic reversal of the motor 40 particularly during threading operations, with the lowermost part of said cam portion connected to the first step by an inclined camming surface 71, while said first step is connected to the second step by a similar inclined camming surface 72, see Figs. 5, 11, 12 and 13.

The saddle 50 is also provided with a bore which communicates perpendicuarly with the bore in which the cam rod 66 slides and which bore slidably supports a cam plunger 73 which has a reduced portion extending through a shouldered bushing 74 and outwardly of the saddle 50, said bushing serving as an abutment for one end of a coil spring 75 which surrounds the reduced portion of the plunger and has its end abutting the enlarged portion thereof as clearly shown in the drawings.

The reduced portion of the cam plunger 73 extends outwardly of the bushing 74 in the saddle 50 at the rear of the machine and into a housing 76 secured to the rear side of the saddle. An arm 77 is pivotally supported intermediate its ends at 78 in the housing and said arm carries a switch LS3 which is actuated by a switch button 79 axially aligned with the reduced portion of the cam plunger 73. The switch LS3 is located on one side of the pivot 78 for the arm 77 and said arm on the opposite side of said pivot is provided in its edge with a stepped holding notch formed of two portions 80 and 81. A spring pressed plunger 82 supported internally of the housing 76 contacts the inner edge of the arm 77 and normally acts to rock said arm about the pivot 78 in an anticlockwise direction as viewed in the drawings and to hold the arm against a part later to be referred to.

The housing 76 is provided with an internal bearing boss which rockably supports the vertically extending shaft 83 that has on its lower end a finger portion 84 and on its upper end a thumb lever 85, the hub of which is provided with a pointer portion 86 that cooperates with indicia indicating the two hifferent operative positions of the finger portion 84, namely, the letters "L" and "E" representing, respectively, "Late" and "Early," see Figs. 3 and 10.

The adjustments provided for by the thumb lever 85 refer to early and late threading operations. As will later be explained, other control mechanism functions in conjunction with the switch LS3 for threading operations. The finger portion 84 of the shaft 83 extends into the recess forming the stepped holding portions 80 and 81 of the arm 77. It will be seen that when the thumb lever 85 is in the position shown in Figs. 5 and 11 the finger portion 84 is in the holding recess 80 and the lever arm 77 is substantially parallel to the cam rod 66. This is the "E" or early position and will be used when the threading operation involves the use of a solid tap or solid die.

It will be noticed by reference to Fig. 5 that when the lever arm 77 is in the position just referred to and the plunger 73 extends into the deepest portion of the cam recess of the rod 66 the reduced end of the plunger is contacting the switch actuating button 79 but is not depressing said button. It will further be noted that during a threading operation when a stop screw 64 has contacted and moved the abutment member 65 and shifted the rod 66 from the position shown in Fig. 5 to the position shown in Fig. 11 the plunger 73 has been moved by the inclined surface 71 to compress the spring 75 and to depress the switch actuating button 79 to actuate the switch LS3 carried by the arm 77 to reverse the motor 40 in a manner later to be explained.

It will be noted that after the parts are in the position shown in Fig. 11 the movable abutment member 65 is still out of contact with the positive stop lug 67. The spindle will coast in its forward rotation causing a continued forward movement of the slide due to the threading engagement between the tool and the work piece. When the switch LS3 is actuated to effect a reversal of the motor 40 the threaded tool tends to back off and disengage itself from the work piece when the motor rotates in the reverse direction, while the operator simultaneously effects the rearward movement of the slide during the backing off of the tool by manually turning the turnstile 53. It will be understood that the amount of movement of the slide due to the coasting of the spindle depends upon the coarseness or fineness of the thread being cut on the work piece since the slide will move farther in the case of a coarse thread for the same number of coasting revolutions then it would in the case of a fine thread. If the operator finds during the set-up of the machine that the thread cut on the work piece is too short or too long he may adjust the stop screw 64 to cause the latter to engage the movable stop member 65 earlier or later as the case may be.

In the use of collapsible taps or collapsible dies for threading a work piece the motor 40 can be reversed at a later point than was the previously described case, since the collapsing of the tap or die terminates the thread cutting and therefore the coasting of the motor does not cause any forward movement of the slide. In the instance just referred to the operator turns the thumb lever 85 to bring the pointer 86 into line with the letter "L" indicating late operation of the switch LS3 and such movement of the thumb lever brings the parts into the relationship shown in Fig. 12.

It will be seen that the positioning of the thumb lever 85 in the manner stated has caused the finger 84 to move out of the holding recess 80 and into the holding recess 81 of the lever arm 77, with the result that said arm has been rocked in a clockwise direction from the position shown in Fig. 11 to the position shown in Fig. 12 and which movement of the arm compresses the spring plunger 82 and moves the switch actuating button 79 out of contact with the reduced extended end of the plunger 73, although the inner end of said plunger is in the lowermost portion of the cam recess in the rod 66. Consequently when the slide is moving forwardly and the stop screw 64 contacts the movable abutment member 65 and shifts the rod 66 to compress the spring 69 the plunger 73 will travel up the inclined surface 71 and onto the first step and this movement of the plunger 73 brings the extended end of the plunger into contact with the switch actuating button 79 but does not depress said button. The forward movement of the slide continues and the rod 66 is further shifted, with the result that the end of the plunger 73 rides up the inclined surface 72 and onto the second step of the rod 66, wherefore the extended end of the plunger depresses the switch actuating button 79 and actuates the switch LS3 as indicated in Fig. 13. This actuation of the switch LS3 effects a reversal of the motor 40. At the time that the switch LS3 is actuated to reverse the motor 40 the collapsible tap or die has completed its threading operation and will collapse in the usual manner, wherefore the threaded relationship between the threaded tool and the work is terminated and consequently any coasting of the motor and the spindle before reversing will not result in any further forward movement of the slide.

The switch box or housing 76 has fixed to its outer and left hand side as viewed in Fig. 2 a switch box 87 which houses a normally open switch LS5, the switch button 88 of which is depressed momentarily to close said switch in the rearward movement of the slide by a dog 89 fixed to the side of the slide as indicated in Fig. 3. The switch box 87 also houses a switch LS11, the purpose of which will later be explained, see Fig. 4. The electrical conduits from the switches LS3, LS5 and LS11 extend from the switch boxes 76 and 87 through a flexible cable 90 to the cam disk supporting drum housing portion 63 where said conduits are properly connected to four switches later to be referred to and contained within said housing portion 63.

It will be understood that the switches LS3, LS5, LS11 and the switches in the housing 63 are also suitably connected to the control panel of the motor 40 by electrical conduits located within the tube 91 extending from the switch box 76 to the pedestal 36 located beneath the headstock. The end of the flexible cable 90 which is attached to the housing portion 63 moves with the slide 51 as indicated by full and dash lines in Fig. 2 and said cable is guided and supported in a V-shaped support 92 secured to a fixed part of the machine which in this instance is the pan.

The switch box 87 rockably and slidably mounts an actuating plunger 93, see Fig. 4, which is provided with an annular groove that is normally so positioned as to receive the extended switch button 94 of the normally closed switch LS11. The plunger 93 has fixed thereto within the switch box 87 a collar 95 that limits the movement of the plunger toward the right as viewed in Fig. 4. A stop arm 96 is fixed to the other end of the plunger 93 and a coil spring 97 surrounds said plunger between the switch box 87 and the stop arm 96 and acts to normally hold the plunger in a position wherein the collar 95 contacts the interior of the switch box and the annular groove of the plunger is in position to receive the extended switch button 94. The stop arm 96 and the plunger 93 are normally rocked to a position wherein said stop arm is substantially horizontal, as indicated by dash line position of Fig. 4a, and in which position the stop arm is out of the path of movement of the plate on which is located the dog 89. The stop arm 96 is in its horizontal position when the machine is utilizing a plurality of different tools mounted on the various faces of the turret 52 for performing a plurality of machining operations upon the work piece and under such conditions the slide is moved rearwardly sufficiently far at the end of each operative step of the work cycle to effect indexing of the turret, it being understood that the normally closed switch LS11 remains closed throughout the operative cycle.

However, there are occasions when the machine will be employed with only a single tool on one face of the turret to perform a single machining operation on the work piece and after each such machining operation the turret need not be indexed while the spindle should be stopped for the purpose of unloading and loading the work pieces. In such a situation the normally closed switch LS11 is employed to effect stopping of the spindle before the slide has moved rearwardly to turret indexing position and to maintain the spindle stopped until the slide is again moved forwardly. When it is desired to accomplish this the operator swings the stop arm 96 from the dash line position of Fig. 4a into the vertical full line position of Figs. 4 and 4a and wherein said stop arm will lie in the path of the plate which carries the dog 89. Consequently as the slide is moved rearwardly upon the completion of a machining operation upon the work piece the plate will engage the stop arm 96 substantially simultaneously with the depression of the switch button 88 of the switch LS5 by the dog 89. The continued rearward movement of the slide causes the plate to move the stop arm 96 and the plunger 93 rearwardly against the action of the spring 97 until the switch button 94 of LS11 has moved out of the annular groove in the plunger and has been depressed by the plunger to open the switch LS11 and, as will later be explained, to stop the motor 40 and the rotation of the spindle.

The stop arm 96 provides a positive stop so that the operator knows he has moved the slide rearwardly the required distance to open switch LS11, it being understood that this occurs prior to the slide reaching turret indexing position, wherefore the turret 52 is not indexed and the single tool carrying face remains in operative position. As soon as the spindle has stopped the operator unloads the finished work piece from the chuck in the spindle and loads a new work piece therein, after which he again moves the slide forwardly by the turnstile whereupon the spring 97 restores the plunger 93 and stop arm 96 to their most right hand position as indicated in Fig. 4 and the switch LS11 automatically closes as soon as the switch button aligns with the groove in the plunger. The forward movement of the slide also causes the dog 89 to momentarily depress the switch button 88 of the normally open switch LS5 to momentarily close said switch and complete the circuit to start the motor as will be explained in relation to the diagram of Fig. 32.

The sleeve portion of the stop roll 60 within the cam disk supporting drum housing 63 and to the left of the bearing boss 61, as viewed in Fig. 5, has fixed thereto a gear 98 which meshes with four gears 99, 100, 101 and 102. The gears 99 and 100 are formed on similar cam disk supporting drums 103 rotatably supported in the housing 63 on shafts 104 mounted in bosses formed interiorly of the housing 63, see Figs. 5 and 6. The gears 101 and 102 are similarly formed, respectively, on cam drums 105 and 106 correspondingly rotatably supported within the housing 63 on similar shafts 104. It will be seen that each time the stop roll 60 is rotated by the indexing movement of the turret the two identical cam drums 103 and the cam drums 105 and 106 will have a corresponding rotative indexing movement.

The two cam drums 103 each is provided in this instance with six equally spaced circularly arranged recesses 107 and which recesses face toward the switch buttons of two position switches LS4 and LS10. The cam drum 103 which carries the gear 99 cooperates with the switch LS10 while the cam drum 103 which carries the gear 100 cooperates with the switch LS4. In each indexed position of the cam drums 103 a recess of said drums will be aligned, respectively, with the switch buttons of switches LS4 and LS10. The drums 103 each carry six identical switch button actuating disks 108 formed on shouldered or enlarged portions of plungers 109 and which portions slidably interfit the recesses 107. The plungers 109 slidably pass through openings in the drums and have fixed to their outer ends buttons 110. Each button 110 is provided on its side adjacent to the cam drums with a radially extending V-shaped ridge 111 adapted to cooperate with a complementary V-shaped groove 112 formed in the adjacent face of the drum.

It will be seen that when the plungers 109 are rotated to one position relative to the drum the ridges 111 can extend into the grooves 112 and the plungers will be fully extended while when the plungers are rotated from such position through an arc of 180° the ridges 111 will extend transversely to the grooves 112 and be in engagement with shallow notches on the face of the drums and the plungers will be held in retracted position.

In each recess 107 there is provided a coil spring 113 which acts against the enlarged portion of the respective plunger and tends to move said plunger toward the left as viewed in Fig. 8. Consequently, it will be apparent that when the ridges 111 are aligned with the grooves 112 the springs 113 act to move the plungers to their most left hand or extended position at which time the disks 108 are located so as to engage and actuate the switch buttons of the switches LS4 and LS10 as the case may be when the drums are indexed.

It will also be noted that when the plungers are retracted and the ridges 111 extend transversely to the grooves 112 the springs 113 are compressed and the disks 108 are located in a plane wherein they will not actuate the switch buttons as the drums are indexed.

As previously stated, there are six of the plungers 109 in each cam drum 103 corresponding, in this instance, to the six operative steps of a work cycle and said plungers can be selectively positioned in correlation to the different operative steps either to actuate the switch buttons or to be inactive with respect thereto as the drums are indexed.

In Fig. 14 the plungers 109 of both drums 103 which function, respectively, in steps 1, 4 and 5 of the operative cycle are shown in extended position such that the disks 108 thereof will engage and depress the switch buttons of switches LS4 and LS10 as the cam drums are indexed in relation to the indexing of the turret. Also it will be noted that the plungers 109 corresponding to operative steps 2, 3 and 6 are in retracted position, wherefore the indexing of the cam drums for such operative steps will not cause the disks 108 of these plungers to actuate the switch buttons of the switches LS4 and LS10, as the case may be. The buttons 110 of each drum 103 may be provided with indicia representing the different operative steps of the work cycle, wherefore the operator by opening the cover 63a of the housing 63 can adjust the plungers 109 to effect or not to effect actuation of the switches LS4 and LS10 in the different steps of the cycle as desired. It will be understood that the same switch and switch button are illustrated in Fig. 14 by the full line and dash line showings. In addition, it will be understood that the plungers of the drum which is associated with switch LS4 may have one arrangement while the plungers of the drum associated with switch LS10 may have the same or a different arrangement. The switch LS4 is a two-position switch and controls the high and low speed of the motor as will be explained in connection with the wiring diagram of Figs. 32, 33 and 34. The switch LS10 is a two-position switch and controls the energization and deenergization of solenoids 114 and 115 as will also be explained in connection with the wiring diagram. The solenoids 114 and 115 effect the actuation of a pivoted lever 116 which is operatively connected to the adjustable clutch element 48, see Fig. 29, wherefore said switch LS10 controls the high and low speed ranges of the spindle by selectively engaging the clutch element 48 with either the gear 44 or the gear 45.

The drum 105 which carries the gear 101 is likewise provided, in this instance, with six recesses 117 that are spaced about a circle concentric to the shaft 104 and said recesses face toward the switch buttons of normally open switch LS2 and two position switch LS7, and one of said recesses will be aligned with both of said switch buttons in each indexed position of the drum 105. The drum 105 carries six plungers 118, the enlarged or shouldered portions of which slidably interfit the recesses 117 while said plungers slidably extend through openings in the drums and are provided on their ends beyond said openings with operating buttons 119. The opposite ends of the plungers adjacent the enlarged portions thereof are provided with cam disks 120 and have a central diametrically extending raised portion 120a from each side of which the disks taper downwardly to their circumferences. Each cam disk 120 will as the drum is indexed successively come into alignment with the switch buttons of both switches LS2 and LS7 and will act in certain operative positions now to be described to actuate one or both of said switch buttons as the drum is indexed or in another position of the plungers will be inactive with respect to both of said switch buttons.

Each button 119 is provided on its face adjacent to the drum 105 with a radially extending V-shaped ridge or lug 121 and said ridge can be positioned by turning the button and plunger to contact the face of the drum to hold the plunger and cam disk 120 fully retracted as shown in position 1 of Fig. 15 or it can be positioned to engage in a relatively shallow V-shaped groove 122 formed in the face of the drum to allow the plunger and cam disk 120 to be partially extended as shown in position 2 of Fig. 15 or it can be positioned in a deeper radially extending V-shaped groove 123 to allow the cam disk and plunger to be fully extended as shown in position 3 of Fig. 15. A coil spring 124 is mounted in each recess 117 to act on each plunger and tends to hold the latter in extended position.

Intermediate the switch buttons of the switches LS2 and LS7 and the cam disk which is currently aligned with said switch buttons is a supporting arm 125 carried by the housing 63 and slidably mounting a pin 126 which has one end adapted to contact the cam disks 120 while its other end is provided with a disk 127 adapted to engage the switch buttons of the switches LS2 and LS7.

It will be noted that in position 1 of Fig. 15 the switch buttons of both switches are fully extended and that the switch button of switch LS2 projects outwardly of the switch a greater distance than does the switch button of switch LS7. It will be seen that as the cam drum is indexed to positions 1, 2, 3 and 6 no effect will be had on either of the switch buttons since the plungers 118 corresponding to these positions are fully retracted and therefore the pins 126 will lightly engage the raised portions 120a of the cam disks but the pins will not be moved. When the drum 105 is indexed to position 4, the plunger 118 correlated to said position being partly extended, the pin 126 will ride upon the raised portion 120a of the cam disk and said pin and disk 127 will be moved to depress the switch button of switch LS2 and to close said switch which, as will be later explained, is a normally open switch controlling the automatic reversal of the motor. In position 4 the switch LS7 is not actuated. Then as the drum 105 indexes to position 5, the plunger 118 corresponding to said position being fully extended, the raised portion 120a of the cam disk of said plunger will move the pin 126 and the disk 127 still farther to depress the switch button for switch LS7 which latter switch is a two-position switch as will later be explained, in connection with the diagrams of Figs. 32, 33 and 34. It will be understood that when the button of switch LS7 is depressed the button of switch LS2 is farther depressed in the switch closing direction.

All of the cam disks 120 are shown positioned in Fig. 15 with the raised portions 120a thereof extending in a chordal direction. Referring to Fig. 15, two of the cam disks 120 are shown with the left hand disk positioned with the raised portion 120a extending in a chordal direction as shown in Fig. 15a and with the plunger in its partially extended position wherein switch LS2 is actuated but not switch LS7.

In Fig. 15 the right hand cam disk 120 is shown turned 90° from the previously mentioned cam disk and with the raised portion 120a thereof extended as indicated in Fig. 15b and at right angles to its position as shown in Fig. 15a. Still referring to Fig. 15 it will be seen that as the drum 105 indexes the pin rides off the left hand cam disk 120, whereupon the switch LS2 momentarily opens and then the pin rides up the inclined portion of the right hand cam disk 120 and onto the raised portion 120a thereof to again close switch LS2.

This arrangement effects momentary opening of switch LS2 for interrupting a holding circuit later to be described in connection with the wiring diagrams of Figs. 32, 33 and 34. If two adjacent plungers 118 of the drum 105 are partially extended or completely extended and the raised portions 120a of their cam disks extend in a chordal direction, as indicated in Fig. 15a, then in indexing from the preceding operative step to the next operative step the pin 126 remains in engagement with the raised portions 120a of the two cam disks merely passing from one to the other during the indexing movement and the switches LS2 and LS7 are not affected by such indexing movement.

The indexible cam drum 106 which has formed thereon the gear 102 is provided in this instance with six recesses 128 facing toward the switch LS6 carried by the housing 63 and with the switch button of which the cams of the drum 106 cooperate. Plungers 129 extend into the recesses 128 and are guided therein by annular portions 130, said plungers also slidably extending through openings in the drum and having fixed on their outer ends buttons 131.

The plungers beyond the annular portions 130 are each formed with a pair of spaced lugs 132 which mount a fulcrum pin 133. A cam 134 is pivotally mounted on each fulcrum pin 133 by means of spaced legs depending from said cam while a rat trap spring 135 mounted on said pin acts to maintain the cam 134 in its normal or raised position in a plane parallel to the adjacent face of the drum. The cams 134 are of general rectangular shape, as indicated in Fig. 16a, and are provided at one end with an elongated gradually upwardly inclined portion 136 while their opposite ends are provided with short beveled surfaces 137. One longitudinal edge of the cams is formed with a short beveled surface 138 while the other longitudinal edge 139 thereof is straight. Each button 131 is provided on its side adjacent to the drum 106 with a V-shaped ridge or lug 140 adapted to bear against the adjacent face of the drum to retain the plungers and cams fully retracted or to engage in any one of three V-shaped grooves 141, 142 or 143 formed in the face of the drum and spaced 90° apart when the plungers are fully extended to a position wherein the cams will engage and actuate the switch button of the switch LS6.

A coil spring 144 is mounted in each recess in surrounding relation to the plunger therein and acts against the annular portion 130 to normally urge the plunger and its cam to fully extended position unless the latter is held retracted by the engagement of the lug 140 with the face of the drum. The switch LS6 is a normally closed switch located in the start and stop circuit as will later be described in connection with the diagrams of Figs. 32, 33 and 34.

Referring to Fig. 16 it will be seen that the plungers 129 of the drum 106 correlated to operative steps 1, 2, 3, 4 and 5 are in fully retracted position and hence the cams 134 of these plungers do not actuate switch LS6 during the first five operative steps of the work cycle and as the drum indexes. The plunger 129 corresponding to the sixth operative step is in extended or projected position and is turned so that the cam 134 thereof is positioned with its long dimension in the direction of indexing movement. Hence when the drum indexes from position 5 to position 6 the button of switch LS6 will ride up the inclined surface 136 of this cam 134 and onto the raised flat surface of the cam and will remain on such surface after the drum has been completely indexed to the sixth operative step, wherefore switch LS6 will be held open throughout the sixth operative step and this will result in the motor 40 being deenergized and the spindle stopped during the sixth step as will be explained in connection with the wiring diagrams of Figs. 32, 33 and 34. This condition is desired for purposes of unloading and loading the work pieces as will later be referred to in the description of the operative cycle.

It will be understood that when the plungers 129 are fully extended and are turned so that the cams thereof are in the position of the cam 134 of plunger No. 2 then the indexing of the drum 106 from one step to the next step causes the button of switch LS6 to ride up the inclined surface 138 of the cam and onto the raised portion thereof to depress the switch button and momentarily open switch LS6 and when the indexing movement is completed said switch button will have ridden off of the narrow dimension of the cam and switch LS6 will again be closed. This is for the purpose of momentarily braking the holding circuit around switch LS5 as will be fully explained in connection with the wiring diagram of Fig. 32.

Referring to the cam 134 of the first operative step as shown in Fig. 16, it will be noted that said cam is turned 180° with respect to cam for step No. 2. Assuming that the plunger for step No. 1 is fully extended, it will be understood that when the drum 106 indexes from the sixth step to the first step the switch button of switch LS6 simply rocks the cam 134 about its pivot 133 and against the action of the spring 135 until the indexing movement is completed, at which time the cam rides to its normal position and the switch button is located intermediate the cams of steps 1 and 2. The tripping of the cam 134 by the switch button does not actuate switch LS6.

The cam 134 for the first operative step may be positioned as just described so as to enable the operator should he desire to do so to back index the turret from position 1 to former position 6 to stop the spindle as will be explained. When the operator back indexes the turret, as just referred to, the switch button of switch LS6 rides up the incline 138 of the No. 1 cam and onto the high part of the cam, with the result that switch LS6 is opened momentarily as the button travels across the narrow width of the cam and is then closed. The momentary opening of the switch LS6 interrupts the holding circuit for switch LS5 and the motor is deenergized and the spindle is stopped. When the operator wishes to proceed with step No. 1 he again indexes the turret from position 6 to position 1 in the forward direction as has been previously explained and the switch button merely trips the cam 134 and the switch LS6 remains closed. As soon as the operator moves the slide forwardly and the switch LS5 is momentarily closed by said slide the motor is again actuated, the spindle revolves and a holding circuit is established around switch LS5 as will later be pointed out.

It will be understood that the arrangements of the plungers in the drums 103, 105 and 106 as shown in Figs. 14, 15 and 16 are selected purely for purposes of illustration and that such arrangements may be varied to meet different operative requirements of the machine.

As shown in Figs. 1 and 17 a control panel 145 is secured to the front side of the headstock 38 and said control panel carries a master switch control lever 146 which is fixed in a lever bracket 147, see Fig. 18. The lever bracket 147 in its lower portion and adjacent to the panel 145 is provided with a recess 148 into which extends the projecting end of a switch shaft 149 later to be referred to. A bearing pin 150 is carried by the bracket 147 and extends through the shaft 149 and forms a pivot about which the bracket and the lever 146 can be rocked from the full line position of Fig. 18 to the dash line position thereof, it being noted that the lower right hand portion of the bracket 147 is beveled to permit this rocking movement and to form a stop to limit the extent thereof. Bracket 147 is provided with a vertically extending recess in which is slidably mounted a spring pressed plunger 151 which engages the upper side of the shaft 149 and which functions in conjunction with a pin 152 carried by the bracket and engaging the underside of the shaft to return automatically the bracket 147 and the lever 146 when released from their outwardly swung position i. e., the dash line position of Fig. 18, back to their normal or full line position. The recess in the bracket 147 engages with flat portions of the shaft 149, wherefore said bracket 147, the lever 146 and the shaft 149 can be rocked about the axis of the shaft into any one of four different positions.

The bracket 147 above the recess 148 is provided with a flat segmental shaped surface adjacent the panel 145 and said surface contacts a switch rod 153 which is slidably supported by the panel 145 and has at its inner or right hand end, as viewed in Fig. 18, a recess portion housing a coil spring 154 which abuts against a reversing switch LS1 and functions to urge the switch rod 153 toward the left but said rod is normally held against the action of the spring by the bracket 147. The switch button 155 of the reversing switch LS1 contacts the bottom of the recessed right hand end of the switch rod 153 and said rod normally maintains said button depressed for forward actuation of the motor 40. However, when the operator rocks the lever 146 and the bracket 147 from the full line position of Fig. 18 into the dash line position thereof the rod 153 moves toward the left under the action of the spring 154 and the switch button 155 follows the movement of the rod and the switch LS1 is actuated for reverse operation of the motor 40. As soon as the operator releases the lever 146 the spring pressed plunger 151 overcomes the action of the spring 154 and restores said lever, the bracket 147 and the rod 153 to the position shown in full lines in Fig. 18, at which time the button 155 of the switch LS1 is again depressed and said switch is set for forward operation of the motor.

The switch shaft 149, as previously stated, is rockably supported in the panel 145 and it will be noted by reference to Fig. 18 that the rear end of said shaft is rockably supported in a plate 156 carried by a plurality of parallel rods 157 secured in and projecting rearwardly from the panel 145. The switch shaft 149 is provided with a plurality of axially spaced shoulders 158, 159, 160, 161, 162, 163, 164, 165 and 166. A pin 167 extends between the shoulders 158 and 159 and is parallel to the shaft 149 but is spaced radially with respect thereto, see Fig. 19. Two actuating pins 168 and 169 extend between the shoulders 159 and 160 and said pins are parallel to the shaft 149 but radially spaced therefrom, with the pin 168 angularly spaced from the pin 169, see Fig. 20. A single actuating pin 170 extends between the shoulders 160 and 161 in radially spaced but parallel relationship to the shaft 149. Two actuating pins 171 and 172 extend between the shoulders 161 and 162 in parallel radially spaced relationship to the shaft 149 with the pin 171 angularly spaced from the pin 172. A single actuating pin 173 extends between the shoulders 162 and 163 in spaced parallel relationship to the shaft 149. Between the shoulders 163 and 164 extends a single actuating pin 174, also arranged in radially spaced parallel relationship with respect to the shaft 149. Likewise a single actuating pin 175 extends between the shoulders 164 and 165 while between the shoulders 165 and 166 three angularly spaced actuating pins 176, 177 and 178 extend in parallel radially spaced relationship relative to the shaft 149. The pins 167, 170 and 178 are located in the same relative angular position with respect to each other. Actuating pin 175 is depressed 30° from actuating pins 167, 170 and 178. Actuating pins 169, 172, 173 and 177 are angularly displaced 30° from actuating pin 175 or 60° from actuating pins 167, 170 and 178. Actuating pins 168, 171, 174 and 176 are displaced 90° from actuating pins 167, 170 and 178. Four of the rods 157 are grouped in pairs above and to the left of the shaft 149, as viewed in Fig. 19 and these rods support cooperating switch contacts 179 and 180 located so as to extend past the shaft 149 and between the shoulders 158, 159, 160, 160, 161, 161, 162, 162, 163, 163, 164, 164, 165 and 165, 166 and the switches formed by the pairs of contacts 179 and 180 are hereinafter designated as switches MS1, MS2, MS3, MS4, MS5, MS6, MS7 and MS8, see Fig. 18. Each of the contacts 179 and 180 has a clip portion 181 which embraces the rods 157 and holds the contacts in proper position on the rods.

It will be understood that the contacts 179 and 180 are suitably insulated from the rods and at their upper ends are provided with binding screws 182, whereby electrical conduits can be connected to the contacts. Each contact 180 is provided intermediate its end with an offset portion 183 arranged to be engaged by its respective actuating pin or pins to close the contacts 179 and 180, it being understood that when said portion is not engaged by its respective actuating pin or pins the resilience of the contacts maintain the same normally separated.

When the lever 146 is in the "High" position i. e., the full line position of Fig. 17, the contacts 179 and 180 of switches MS1, MS3, MS5 and MS7 are open while the actuating pins 168, 171, 174 and 176, respectively, of switches MS2, MS4, MS6 and MS8 have engaged the portion 183 of their cooperating contact arm 180 and have closed the contacts 179 and 180 of said switches. When the lever 146 is moved to the "Low" position of Fig. 17 the contacts of switches MS1, MS3, MS6 and MS7 remain open. At this time the pin 169 of switch MS3 has come into engagement with the portion 183 of its contact arm 180 and thus the contacts 179 and 180 of switch MS2 are held closed in the low position of the lever. Also at this time the actuating pin 172 of switch MS4 functions to hold the contacts of said switch closed as does also the actuating pin 177 of switch MS8. In addition, in the low position of the lever the actuating pin 173 of switch MS5 has come into engagement with the portion 183 of its contact arm to effect the closure of the contact arms 179 and 180 of said switch. When the lever 146 is in "Release Braking" position of Fig. 17 the contacts of switches MS1 and MS3 remain open. Also at this time the actuating pins of switches MS2, MS4 and MS8 are out of engagement with the portion 183 of the respective contact arms 180 and hence the contacts of said switches are open. In addition the contacts of switches MS5 and MS6 are opened since the actuating pins 173 and 174 of said switches are out of engagement with their respective contact arms 180 at the time the actuating pin 175 of switch MS7 has functioned to close the contacts of said switch, in other words, in the "Release Brake" position of the lever 146 all of the MS switches are opened except switch MS7. In the "Off" position of the lever 146, as shown in Fig. 17, the actuating pins 167 of switch MS1, 170 of switch MS3 and 178 of switch MS8 have engaged their respective contact arms to close the latter while the actuating pins of switches MS2, MS4, MS5, MS6 and MS7 are out of engagement with their respective contact arms and said switches are open.

The panel 145 below the rods 157 and the MS switches just described supports a plurality of rearwardly extending parallel rods 184 with said rods supporting at their rear ends a plate 185. The rods 184 of the upper group of rods are arranged in cooperating pairs similar to the arrangement of the rods 157 to support a plurality of contact arms 186 and 187, with the latter arms provided with a bowed portion 188. The pairs of contact arms are spaced longitudinally of the rods and extend between shoulders 189, 190; 190, 191; 191, 192; 192, 193; and 193, 194 formed on a rockable shaft 195 mounted in the panel 145 and in the plate 185 and extending parallel to the shaft 149. The shoulders 189, 190 have extending therebetween actuating pins 196 and 197 that are parallel to the shaft 195 but radially spaced therefrom and angularly spaced with respect to each other. These actuating pins 196 and 197 are adapted to engage with the portion 188 of contact arm 187 that is located between said shoulders to close said arm and its cooperating contact arm 186. The structure just defined constitutes switch SS1. A single actuating pin 198 extends between the shoulders 190 and 191 and is adapted in a certain predetermined position to close the contact arms located between said shoulders. This arrangement constitutes switch SS2. Between the shoulders 191 and 192 is an actuating pin 199 which with the contact arms 186 and 187 between said shoulders constitutes switch SS3. The shoulders 192 and 193 have extending therebetween an actuating pin 200, which with the contact arms located between said shoulders constitutes switch SS4. The shoulders 193 and 194 carry an actuating pin 201 which with the contact arms between said shoulders constitutes switch SS5.

Referring to Figs. 19, 20, 21, 22, and 23 it will be seen that actuating pins 196 and 197 of switch SS1 are angularly spaced 30° apart. Also it will be noted that actuating pin 198 of switch SS2 is in the same relative position as actuating pin 197 while actuating pin 199 of switch SS3 is in the same relative position as actuating pin 196. Likewise it will be observed that actuating pin 201 of switch SS5 corresponds in its relative position to actuating pins 199 and 196 already referred to while actuating pin 200 of switch SS4 is located in a position displaced 15° from pins 199 and 201. The shaft 195 is adapted to be rocked by a knob 202 fixed to the shaft on the front side of the panel 145 and bearing an arrow or other suitable means to cooperate with the indicia "Auto. Safe Stop Set-Up and Hand." When the knob 202 is in the position shown in Fig. 17 with the arrow thereof registered with "Safe Stop Set-Up" the actuating pin 200 of switch SS4 will have contacted the portion 188 of its contact arm 187 and will have closed the contacts 186 and 187 of said switch while the actuating pins of the remaining switches SS1, SS2, SS3 and SS5 will be out of engagement with the portions 188 of their contact arm 187 and hence the contacts of said switches will be open. When the knob 202 is turned to have the arrow register with the notation "Auto." the actuating pins 197 of switch SS1 and 198 of switch SS2 will have engaged the portions 188 of their respective contact arms 187 to effect closure of the contact arms 186 and 187 of said switches. At this time the actuating pins of switches SS3, SS4 and SS5 will be out of engagement with the portions 188 of their respective contact arms 187 and hence the contact arms of said switches will be open. When the knob 202 is turned to have the arrow registering with the notation "Hand" then the actuating pins 196 of switch SS1, 199 of switch SS3 and 201 of switch SS5 will have engaged the portions 188 of their respective contact arms 187 and have effected closure of the contact arms 186 and 187 of said switches. At this time the actuating pins of switches SS2 and SS4 will be out of engagement with the pins 188 of their contact arms 187 and hence the contact arms 186 and 187 of said switches will be open.

The panel 145 is provided with a rockable knob 203 which can be moved to either "On" position or "Off" position to actuate a spindle positioning switch SP shown in the diagrams of Figs. 32, 33 and 34. The panel 145 also carries a rockable knob 204 which can be moved to either a low or a high position to actuate two-position switch BG which controls the energization and deenergization of solenoids 114 and 115 to effect engagement of the shiftable clutch element 48 with either the gear 45 or the gear 44. As will later be pointed out the knob 204 is only employed during hand control of the machine since during automatic control of the machine the two-position switch LS10 controls the energization and deenergization of the solenoids 114 and 115. The panel 145 may also be provided with suitable signal lights 205 and 206 arranged in the control circuit if desired but not shown in the diagrams of Figs. 32, 33 and 34.

The spindle positioning switch SP controlled by the knob 203 forms a part of a spindle positioning mechanism disclosed in my copending application Serial No. 587,701, filed April 11, 1945, and illustrated herein in Figs. 29 and 30. The said application issued January 24, 1950, as Patent No. 2,495,507.

Referring to Figs. 29 and 30 it will be seen that the shaft 42 of the motor 40 is provided with a brake pulley and also is operatively connected with a plugging switch PLS which will be referred to in the description of the diagrams of Figs. 32, 33 and 34.

The work spindle 39 has mounted thereon a cam ring 208 which is provided on its periphery with a segmental cam portion as clearly shown in my said copending application. This cam ring 208 is adapted to cooperate with a control device forming part of the means for stopping the spindle in predetermined position. The control device may be a unitary structure which is attached to a support 209 within the headstock. This device comprises a sleeve portion 210 which extends through an opening in the support 209 and a bracket portion 211 located on one side of the support 209. The sleeve portion 210 slidably supports a vertically extending rod 212 which is held against turning movement in the sleeve portion by suitable means and has its lower end in the form of a fork which mounts a roller 213 arranged to contact the periphery of the cam ring 208. The rod 212 adjacent its opposite end is provided with a collar 214 fixed to the rod and acting as an abutment for a coil spring 215 interposed between the collar 214 and the support 209 and acting to normally urge the rod 212 in an upward direction as viewed in Fig. 29. A collar 216 is freely slidable on the rod 212 above the collar 214 and a coil spring 217 of somewhat greater strength than the spring 215 is interposed between the collars 214 and 216. The upper end of the rod 212 has fixed thereto a laterally projecting switch actuating arm 218 which in a certain position of the rod engages and moves the switch button of a normally open micro switch LS8 to close said switch.

The bracket portion 211 has mounted thereon a solenoid PS and the armature 219 of said solenoid is pivotally connected to a bent lever arm 220 which is pivoted in turn on the bracket portion 211. The lever arm 220 at its free end is provided with a forked portion which straddles the rod 212 just above the movable collar 216 and is in contact with said collar. It will be seen that when the solenoid PS is energized and the armature 219 thereof is moved to rock the lever 220 about its pivot in a counterclockwise direction the forked end of the lever will depress the collar 216 and through the spring 217 and fixed collar 214 will act to shift the rod 212 downwardly against the action of the spring 215 and bring the roller 213 into contact with the periphery of the cam 208.

This is the relationship of the parts shown in Fig. 29 and it will be noted that at this time the switch actuating arm 218 has depressed the switch button of switch LS8 to effect closure of said switch. Each time that the cam portion of the cam ring 208 comes into engagement with the roller 213 as the spindle 39 rotates the rod 212 will be momentarily raised a sufficient distance to move switch actuating arm 218 upwardly and allow switch LS8 to open. During this upward movement of the rod 212 the slidable collar 216 remains stationary, since it is in contact with the end of the lever arm 220 and hence the spring 217 is compressed.

In the event that the solenoid PS should be energized at a time when the cam portion of the ring 208 is in position to be engaged by the roller 213 then the rod 212 would only move a sufficient distance to engage the roller with said cam portion and the further movement of the lever arm 220 under the action of the solenoid would function to compress the spring 217 and the switch LS8 would remain open. However, as soon as the cam portion of the ring 208 moves out of engagement with the roller then the compressed spring 217 will move the rod 212 downwardly to bring the roller into engagement with the periphery of the cam ring and at such time the switch LS8 would be closed as already described.

In Fig. 30 there is disclosed the brake mechanism which cooperates with the drum 207 on the motor shaft 42 to stop said shaft and the work spindle 39 driven thereby in a predetermined position. The brake mechanism comprises a pair of pivoted brake shoes 221 and 222 which are normally moved toward each other and into braking relationship with the pulley 207. The brake shoes 221 and 222 carry at their upper ends remote from their pivots a rod 223 which slides through the upper end of the shoe 221 and is held in the upper end of the brake shoe 222 by means of a collar 224 fixed to the rod on one side of said shoe, and a nut 225 screwed onto the rod on the other side of said shoe. The rod 223 carries a coil spring 226 which has one end abutting the outside of the upper end of the brake shoe 221 and its other end abutting an adjustable nut and washer 227 screwed on the rod. The rod 223 intermediate the upper end of the brake shoe 221 and the collar 224 has fixed thereto a second collar 228 with which cooperates the forked end of the arm 229 of a bell crank lever pivoted at 230 to the brake shoe 221 and having its long arm 231 extending beyond the brake shoe 222 and pivotally connected to the armature 232 of the brake soelnoid B.

It will be seen that when the said brake solenoid B is deenergized the armature 232 and the bell crank lever are in the position shown in Fig. 30 and at this time the spring 44 acting on the brake shoe 221 and indirectly on the brake shoe 222 through the rod 223 rocks the said shoes toward each other and into braking engagement with the pulley 207. When the brake solenoid B is energized and the armature 232 is moved inwardly to rock the bell crank lever in a clockwise direction the short arm 229 of said bell crank lever reacts against the collar 228 and since said lever is pivoted to the brake shoe 221 against said shoe, wherefore the brake shoes 221 and 222 will spread apart to non-braking position and this condition holds so long as the solenoid is energized.

The manner in which the solenoids PS and B cooperate and are energized and deenergized to effect the stopping of the work spindle in predetermined position will be pointed out in the description of the wiring diagrams of Figs. 31, 32, 33 and 34 and in the description of the mode of operation of the machine.

All of the switches in the control circuits have been referred to except switch LS9 which is mounted in and carried by the cam disk supporting drum housing 63, see Figs. 7 and 9. The switch LS9 is a two position switch and is normally closed in the low motor speed position, wherefore when the motor operation is reversed the motor will normally run in reverse at low speed. When the switch LS9 is moved to its other operative position, i. e., high motor speed position, then when the motor is reversed the reverse operation will be at high motor speed. This will be more fully explained in connection with the explanation of the diagrams of Figs. 32, 33 and 34. The switch LS9 is operated by a knob 233 which is located exteriorly of the housing portion 63 and carries a pointer 234 which cooperates with the indicia "On" and "Off" on a plate 235 secured to the exterior of the housing portion at the front side of the machine. When the switch LS9 is in its normal or low reverse motor speed position the pointer 234 cooperates with the indicia "Off" and when the switch LS9 is moved to its other operative position, i. e., the high speed reverse motor position, said pointer cooperates with the indicia "On."

Referring to the power circuit shown in Figs. 31, 33 and 34, the wires 236, 237 and 238 of a multiphase circuit from a suitable source of electrical energy extend to the main disconnect switch 239 having three contacts DS—1, DS—2 and DS—3. The contacts DS—1 and DS—3 are connected by wires 240 and 241 with the primary of a transformer T, the secondary of which energizes the control circuit disclosed in Figs. 32, 33 and 34.

Referring to Figs. 32, 33 and 34, it will be seen that the wires 240 and 241 are extended from the primary of the transformer T by wires 242 and 243. The brake solenoid B is connected to the wire 242 by a wire 244 and to the wire 243 by a wire 245. The switch MS7 is connected by a wire 246 to the wire 242 and by a wire 247 to the wire 244. Switch SS4 is in parallel with switch MS7, being connected to the wire 242 by wire 248 and to the wire 247 by wire 249. Normally open contact FR1 of the forward relay is in wire 244, while normally open contact RR1 of the reverse relay and normally open contact CR3—4 of relay CR3 are connected to wires 244 and 247 in parallel with normally open contact FR—1.

Reverting to the power circuit of Figs. 31, 33 and 34 the three contacts of main disconnect switch 239 are connected by wires 250, 251 and 252 with auto transformer ATF. The three contacts of the main disconnect switch 239 are connected by wires 253, 254 and 255 to the contacts F—1, F—2 and F—3 of the forward contactor 256, which also includes contact F—4 in wire 257 of the reverse portion of the control circuit of Fig. 32, normally closed contact F—5 in wire 258 of the spindle positioning portion of said control circuit and coil F connected to wires 259 and 260 of the forward portion of said control circuit. The contacts F—1, F—2 and F—3 of the forward contactor 256 are connected, respectively, by wires 261, 262 and 263 and wires 264, 265 and 266 to contacts R—1, R—2 and R—3, respectively, of reverse contactor 267, (see Figs. 31, 33 and 34), whereby the polarity of the power circuit can be reversed for reverse operation of the motor 40. The reverse contactor 267 also includes normally closed contact R—4 in wire 260 of the forward portion of the control circuit of Figs. 32, 33 and 34, normally closed contact R—5 in wire 258 of the spindle positioning portion of said control circuit and coil R connected to wire 257 and wire 268 of the reverse portion of said control circuit.

The output sides of the contacts of the forward contactor 256 and the reverse contactor 267 which are in the power circuit are connected by wires 269, 270 and 271 to the contacts L—1, L—2 and L—3 of low speed contactor 272 which has four contacts with the fourth contact L—4 being located in wire 273 of the high speed portion of the control circuit of Figs. 32, 33 and 34 and with coil L connected to wires 274 and 275 of the low speed portion of said control circuit.

The input sides of the contacts L—1, L—2, and L—3 are connected by wires 276, 277 and 278 to the contacts H—1, H—2 and H—3 of the high speed contactor 279, with said three contacts located in the power circuits (see Figs. 31, 33 and 34). At this time it should be noted that high speed contactor 274 also includes contacts H—4 and H—5 in the power circuit and contact H—6 in wire 275 of the low speed portion of the control circuit of Fig. 32 and coil H connected to wire 273 and wire 280 of the high speed portion of the control circuit.

The input sides of contacts L—1, L—2 and L—3 of low speed contactor 272 are connected by wires 281, 282 and 283 with contacts CR3—1, CR3—2 and CR3—3 of contactor CR3 (see Figs. 31, 33 and 34) which, as previously mentioned, also has a contact CR3—4 connected to wires 244 and 247, the brake circuit shown in Figs. 32, 33 and 34 and its coil CR3 connected to wires 258 and 284 of the spindle positioning portion of the control circuit of Figs. 32, 33 and 34. The contacts CR3—1, CR3—2 and CR3—3 of contactor CR3 are connected by wires 285, 286 and 287 to the "auto." transformer ATF located in the power circuit.

The output side of contact L—1 of low speed contactor 272 is connected by wire 288 to the input side of contact H—5 of high speed contactor 279 with said input side of contact H—5 being connected by a jumper wire 289 to the input side of contact H—4 of said high speed contactor. The output sides of contacts L—2 and L—3 of low speed contactor 272 are connected by wires 290 and 291 to the output sides, respectively, of contacts H—5 and H—4 of high speed contactor 279.

The low speed windings T1, T2 and T3 of motor 40 are connected respectively by wire 292 to the input side of contact H—5 by wire 293 to the output side of said contact and by wire 294 to the output side of contact H—4 of the high speed contactor.

The high speed windings T4, T5 and T6 of the motor 40 are connected, respectively by wires 295, 296 and 296a to the output sides of contacts H—3, H—2 and H—1 of high speed contactor 279, it being understood that when the contacts of the high speed contactor in the power circuit are closed the low speed windings T1, T2 and T3 of the motor are in an endless circuit. It will also be understood that the forward and reverse contactors 256 and 267 and the low speed and high speed contactors 272 and 279 are mechanically interlocked so that only the contacts of one or the other of each pair of contactors can be actuated at a time.

From the foregoing it will be seen that when the main disconnect switch 239 is closed the motor 40 can be operated at either low or high working speed in either the forward or reverse direction, or at a slow non-working speed in the forward direction only as will later be more fully explained in connection with the detailed description of the control circuit of Figs. 32, 33 and 34, it being understood that the slow non-working speed is derived from the reduced voltage obtained from the "auto." transformer ATF.

Referring to the control circuit shown in Figs. 32, 33 and 34, the secondary of the transformer T is connected to wires 297 and 298. The wires 297 and 298 are connected by wires 299 and 300 to coil UV in the under voltage portion of the control circuit. Normally open switches SS—1 and MS—1 are located in wire 299 while normally open contact UV is connected to wire 299 in parallel with switch MS—1. Normally closed contact OL is located in wire 300. A wire 301 is connected to wire 299 intermediate the switches SS—1 and MS—1 and extends to and is connected with the wire 304 in the spindle positioning portion of the control circuit. The wire 299 is also connected to a wire 302 which extends to one side of normally open switch MS—2, with the other side of said switch connected to wire 303 that extends to and is connected with wire 327 in the High-Low speed portion of the control circuit.

The wire 299 is connected by wire 305 to the back gear solenoid 114 which in turn is connected by wire 306 to wire 298. The normally open contact of limit switch LS10 is in wire 305 while the normally open contact of switch SS—5 and the normally open contact of back gear switch BG are connected in parallel with said normally open contact of switch LS10 by wire 307 connected to the wire 305. A wire 308 connects the wire 299 with the back gear solenoid 115 and said solenoid 115 is connected by a wire 309 to wire 298. The normally closed contacts of limit switch LS10 and back gear switch BG are located in the wire 308. The portion of the control circuit just described constitutes the on and off under voltage protection and back gear circuit portions of the control circuit. The forward and reverse portions of the control circuit will now be described.

The wire 303 is connected to wire 310 in which is located normally open contact CR2—1 of contactor CR2. The wire 310 is connected by wire 259 previously described to the coil F of forward contactor 256. In the wire 259 are located the normally closed contacts of limit switches LS7 and LS1 and the normally closed contact CR1—1 of relay CR1. It will be recalled that coil F is connected to wire 298 by the wire 260 in which are located the normally closed contacts R—4 of reverse contactor 267 and CR4—1 of relay CR4.

Wires 311 and 312 connect the coil FR of the forward relay to the wires 259 and 298 and in parallel with the coil F of the forward contactor 256 so long as the normally closed contacts in wire 260 remain closed. The coil R of reverse contactor 267 is connected by the wire 268 to the wire 259. In the wire 268 is located the normally open contact CR1—2 of relay CR1 while the normally open contact of limit switch LS1 is connected to the wire 268 in parallel with said contact CR1—2. The wire 268 is also connected to the wire 259 by wire 313 in which are located normally open contact CR1—3 and the normally closed contact CR1—4 of relay CR1. The wire 310 is connected to the wire 313 by a wire 314 in which is located the normally open contact of limit switch LS7.

It will be recalled that reverse coil R connected to wire 268 is also connected to wire 257 in which, in addition to the normally closed contact F—4 of the forward contactor 256, is located the normally closed contact CR4—2 of relay CR4. Wire 315 connects wire 268 with the coil RR of the reverse relay and said coil is connected to wire 298 by wire 316 and is in parallel with coil R of the reverse contactor so long as the normally closed contacts in wire 257 remain closed. The wire 259 is connected by wire 317 to terminal R of plugging switch PLS while wire 268 is connected by wire 318 to terminal F of said switch. The contact arm of the plugging switch is connected by wire 319 with wire 301 and in the wire 319 is located the normally open contact RR—2 of the reverse relay with the normally open contact FR—2 of the forward relay connected to the wire 319 in parallel with contact RR—2. The Auto. Rev., i. e., automatic reverse portion of the control circuit will now be described. The wire 297 is connected by wire 320 to coil CR1 of relay CR1 and in the wire 320 are located in series normally open contacts of limit switches LS2 and LS3, it being noted that the normally open contact CR1—5 is connected to wire 320 in parallel with the normally open contacts of limit switch LS3. The coil of relay CR1 is connected by wire 321 with wire 298. The Auto. start portion of the control circuit will now be described. The coil CR2 of relay CR2 is connected by wire 322 with wire 303 and the normally open contacts of switch MS—4 and limit switch LS5 and the normally closed contacts of limit switches LS11 and LS6 are located in wire 322. Normally open contact CR2—2 is connected to the wire 322 in parallel with the normally open contacts of limit switch LS5. The coil of relay CR2 is connected by wire 323 to wire 298.

The high speed and low speed portions of the control circuit will now be described. As previously stated, the coil H of high speed contactor 279 is connected to wire 298 by wire 273 in which is located normally closed contact L4 of low speed contactor 272. It has also been stated that coil H is connected to wire 280 and it will be noted that said wire includes normally closed contact CR4—3 of relay CR4. The wire 280 is connected to a wire 324 which in turn is connected to a wire 325 that extends to and is connected to the wire 303. The normally open contacts of limit switch LS9 and the normally open contacts CR1—5 of relay CR1 are located in wire 324, while the normally open contacts of switch SS2 are located in wire 325. The wire 280 is also connected by wires 326 and 327 with wire 303 with the normally open contacts of switch MS—6 in wire 326 and of switch SS—3 in wire 327. The wire 274 previously referred to and connected to the coil L of the low speed contactor 272 extends to and is connected with the wire 325 and contains the normally open contacts of limit switch LS4 and the normally closed contacts CR1—7 of relay CR1. The wire 274 is also connected by wire 328 with wire 280 which in turn is connected to the coil H of the high speed contactor 279 and in the wire 328 is located in normally closed contacts of limit switch LS4. The wire 327 is connected to the wire 274 by wire 329 which contains the normally open contact of switch MS—5. The wire 329 is connected by wire 330 with wire 301 and said wire 330 contains the normally open contacts of switch MS—3. Wires 274 and 328 are connected by wire 331 containing the normally closed contacts of limit switch LS9. Wires 328 and 329 are interconnected by wire 332 containing normally open contact CR4—4 of relay CR4.

The spindle positioning portion of the control circuit will now be described. As already explained, the coil of relay CR3 is connected to wires 258 and 284 with the first mentioned wire connected in turn to wire 301 and the second mentioned wire connected in turn to wire 298. In the wire 258 are located the contacts of limit switch LS8 and the normally closed contacts F—5 and R—5 of forward and reverse contactors 256 and 267. The coil of relay CR4 is connected to wires 258 and 298 in parallel with the coil of relay CR3 by wires 333 and 334.

As already stated, the solenoid PS of the spindle positioning mechanism is connected by the wire 304 to wire 303 and said solenoid in turn is connected by wire 335 to wire 298. In the wire 304 are the contacts of spindle positioning switch SP which is actuated by knob 203 on the panel 145, see Fig. 17, and also the contacts of switch MS8. In addition the normally closed contacts FR—3 and RR—3 of forward relay FR and reverse relay RR are located in the wire 304.

In order to explain the function of the parts heretofore described and particularly the various switches, the operation of the machine will now be described for both manual and automatic operation with special reference to the wiring diagrams of Figs. 31, 32, 33 and 34 showing respectively the power and control circuits. The description of the operation of the machine will first be with reference to the hand or manual operation thereof, after which the setup and automatic operation of the machine will be described.

When the machine is to be manually operated all of the buttons in housing 63 at the tail end of the ram or slide and carried by the four drums 103, 104, 105 and 106 are pulled out and rotated to a position wherein they are held retracted with their disks in inactive position with respect to actuating switches LS2, LS4, LS6, LS7 and LS10, whereby during the manual operation of the machine these switches are not actuated.

It will be recalled that switch LS2 is normally open and is in the automatic reverse portion of the control circuit; switch LS4 is a two-position switch in the high speed, low speed portion and the contacts thereof in the High speed portion are closed; LS6 is a normally closed switch in the automatic start portion; LS7 is a two-position switch in the Forward and Reverse portion and the contacts thereof in the Forward circuit are closed and LS10 is a two-position switch in the Back Gear circuit portion and the contacts thereof in the line to solenoid 115 are closed.

It will be assumed that the slide 50 is in its rearmost position and the turret has been indexed to bring the face corresponding to step 1 of the work cycle into operative position, the operator will turn the knob 202 on the panel 145, see Fig. 17, until the arrow points to "hand" and in such position switches SS—1 in wire 299 of the "On" and "Off" portion of the control circuit will be closed as will also switches SS—3 and SS—5 in the "High-Low Speed" portion and the "Back Gear circuit" portion respectively. At this time switches SS—2 in the High and Low Speed circuit and SS—4 in the Brake circuit are open. The operator also moves the control lever 146 to "Off" position to close switch MS—1 arranged in wire 299 in series with switch SS—1 and to close switches MS—3 and MS—8 located, respectively, in wires 330 and 304 of the High-Low speed portion and the Spindle Positioning portion of the control circuit. Switches MS—2, MS—4, MS—5, MS—6 and MS—7 at this time are open. The closing of switches SS—1 and MS—1 energize under voltage coil UV whereby contact UV in the holding circuit is closed. Also when switch MS—1 is closed, assuming knob 204 on the panel 145 is in low position, the back gear solenoid 115 is energized since the contacts of limit switch LS10 in wire 308 are closed. Energization of the back gear solenoid 115 rocks lever 116, see Fig. 29, to the right to cause the shiftable clutch element 48 to engage with the gear 44, thus establishing a driving connection from shaft 43 to the spindle 39 through the low speed gear train comprising the gears 44 and 46. At this time the brake solenoid B in wire 245 of the brake circuit is deenergized and hence the brake is on. Assuming that the operator wishes to have the spindle in a definite predetermined position for loading purposes he turns the positioner knob 203 on the panel 145 to "On" position and thus effects the closing of normally open manually operated spindle positioning switch SP in wire 304. Therefore switch MS—8 being closed and normally closed contacts FR—3 and RR—3 in wire 304 remaining closed the spindle positioning solenoid PS is energized. Assuming that the spindle is in a position such that the roller 213, see Fig. 29, is not engaging the cam portion on the periphery of the cam ring 208, the energization of the solenoid PS moves the rod 212 downwardly against the action of the springs 217 and 215 and causes the limit switch LS8 in wire 258 to close, thus effecting energization of coil CR3 of the contactor CR3 and closing contacts CR3—1, CR3—2 and CR3—3 of said contactor and located in the lower circuit, see Fig. 31 and also Figs. 33 and 34. Also at this time contact CR3—4 in the brake circuit is closed, whereupon brake solenoid B is energized and the brake is released. Simultaneously with the energization of coil CR3 relay CR4 is energized, with the result that normally closed contacts CR4—1, CR4—2 in the Forward Reverse portion of the control circuit and CR4—3 in the High speed portion open while normally open contact CR4—4 in the Low speed portion closes. The opening of contacts CR4—1, CR4—2 and CR4—3 interrupts their respective circuits, wherefore forward contactor 256, reverse contactor 267 and high speed contactor 279 in the power circuit will be open at this time. It will be recalled that switch MS—3 in the Low speed circuit is already closed and therefore the circuit is completed to coil L of Low speed contactor 272 to close the contacts L—1, L—2 and L—3 thereof in the power circuit and to open normally closed contact L—4 in wire 273 in the High speed circuit of the control circuit. Hence it will be seen that low voltage current will be flowing from the auto transformer to the low speed windings of the motor 40 to effect slow non-working rotation of the motor and of the work spindle. However, as soon as the roller 213 of the spindle positioning mechanism contacts the high point of the cam on the cam ring 208 the rod 212 will be raised vertically and limit switch LS8 will open, deenergizing the coil of contactor CR3 and the coil of relay CR4, with the contacts of said contactor and said relay returning to their normal position, thus interrupting the low voltage circuit to the motor. At this time brake solenoid B is deenergized and the brake is applied due to contact CR3—4 now being open and the spindle is stopped in the desired predetermined position.

The operator now loads a work piece into the chuck of the spindle and then shifts control lever 146 into high position for high speed forward rotation of the work spindle. At this time switches MS—1 and MS—3 open, while switch MS—8 momentarily opens and then closes and remains closed in the high speed position of the lever. The opening of switch MS—1 does not affect the circuit to coil UV in wire 299 due to the holding circuit which has been established, while the opening of switch MS—3 causes coil L of the low speed contactor 272 to be deenergized. The momentary opening and then closing of switch MS8 in the spindle positioning circuit momentarily deenergizes solenoid PS and then energizes the same. When the control lever 146 is in high position switches MS—2, MS—4 and MS—6 are closed while switches MS—5 and MS—7 are open. The closing of switch MS—2 connects wire 303 with wire 301 that extends to the secondary of the transformer. The closing of switch MS—4 sets up the automatic start circuit so that as soon as switch LS—5 is momentarily closed, as will later be pointed out, said circuit is completed. The closing of switch MS—6 causes coil H of high speed contactor 279 to be energized to close contacts H—1, H—2, H—3, H—4 and H—5 and to open contact H—6 in wire 274 of the Low Speed circuit.

The operator now turns the turnstile 53 to move the slide 50 forwardly to cause the tool for the first operative step to engage the work and perform the machining operation. During the forward movement of the slide the dog 89 engages the button of switch LS5 and momentarily depresses the same to cause normally open switch LS5 to momentarily close and thus complete the circuit through coil CR2 to energize the same and close contacts CR2—1 and CR2—2. The closing of contact CR2—2 establishes a holding circuit around switch LS5 so that the opening of said switch does not interrupt the circuit to coil CR2 and the latter remains energized during the forward movement of the slide. The closing of contact CR2—1 completes the circuit through wires 310, 259, coil F and wire 260 to energize coil F and to actuate the forward contactor 256 to close the contacts F—1, F—2 and F—3 thereof in the power circuit, open contact F—4 in wire 257 of the Reverse circuit and open contact F—5 in wire 258 of the Spindle Positioning circuit. Simultaneously with the energization of coil F coil FR of the forward relay is energized, whereupon contact FR—1 in wire 244 closes, energizing brake solenoid B and releasing the brake. Also contact FR2 closes to establish the plugging switch circuit while FR3 opens to deenergize solenoid PS in the Spindle Positioning circuit. When this has occurred the motor 40 and the work spindle are rotating at high motor speed in the forward direction, it being recalled that the drive from the motor to the spindle includes the low speed gears 44 and 46.

The operator continues the forward movement of the slide until such movement is positively arrested by the stop screw correlated to the first operative step of the cycle engaging stop member 65, whereupon he rotates the turnstile 53 to move the slide rearwardly. The engagement of the stop member 65, as just referred to, effects a closure of switch LS3 but this does not cause coil CR1 to be energized since switch LS2 is open and therefore the spindle continues to rotate in the forward direction at high motor speed. The operator continues the rearward movement of the slide until it reaches turret indexing position whereupon the turret 52 automatically indexes to bring its face correlated to the second operative step into proper position. During the rearward movement of the slide the switch LS5 is momentarily closed and opened but this has no effect since relay coil CR2 remains energized due to the holding circuit.

Assuming that the second operative step of the cycle requires low speed rotation of the spindle in the forward direction, the operator moves the control lever 146 from high position into low position, with the result that switches MS—2, MS—4 and MS—8 remain closed and switches MS—1, MS—3 and MS—7 remain open while switch MS—6 is opened and switch MS—5 is closed. The opening of switch MS—6 interrupts the circuit to the coil H of the high speed contactor 279 to cause contacts H—1, H—2, H—3, H—4 and H—5 in the power circuit to open and contact H—6 in the Low Speed control circuit to close. The closing of switch MS—5 completes the circuit to coil L of the low speed contactor 272 to cause contacts L—1, L—2 and L—3 thereof in the power circuit to close and normally closed contact L—4 in the High Speed circuit to open. Therefore the motor is now rotating at low motor speed in the forward direction. The operator now brings the slide forwardly to engage the tool with the work for the second machining operation and continues this forward movement of the slide until it is positively arrested by its stop screw engaging the stop member 65, whereupon he moves the slide rearwardly until it reaches indexing position at which time the turret indexes to bring its No. 3 face into proper position.

Assuming that it is desired during the third operative step to have the spindle rotating at slow motor speed but with the drive to the spindle through gears 45 and 47 which have a higher ratio than gears 44 and 46, the operator turns the knob 204 on the control panel 145 to high position, whereupon the switch contacts of BG in wire 308 are opened, deenergizing solenoid 115 and the contacts of said switch in wire 307 are closed energizing solenoid 114, thus effecting shifting of the clutch element 48 into engagement with the gear 45 and therefore causing the spindle to be driven by the motor operating at low motor speed but through the high speed gears 45 and 47.

Assuming that the operation of the third step is a threading operation for right hand threads, the operator will move the slide forwardly to engage the tap with the work and until the tap has entered the work the desired distance, whereupon he pulls the control lever outwardly from the full line position of Fig. 18 to the dash line position thereof to close the contacts of switch LS1 in the Reverse circuit to energize reverse coil R and reverse contactor coil RR and to open the contacts of LS1 in the Forward circuit to deenergize coil F and coil FR of the forward relay. The deenergization of coils F and FR returns all of the contacts actuated by said coils to normal position while the energization of coils R and RR closes contacts R—1, R—2 and R—3 of the reverse contactor in the power circuit and opens contacts R—4 in the Forward circuit and R—5 in the Spindle Positioning circuit. The energization of coil RR closes relay contact RR—1 in the Brake circuit to maintain the brake solenoid B energized and the brake released, closes contacts RR—2 in the plugging switch circuit and opens contact RR—3 in the Spindle Positioning circuit. The motor and the work spindle are now rotating in the reverse direction and thus the tap will back off from the work while the slide is moved rearwardly by the operator.

From the foregoing it will have been seen that the operator can select for each operative step forward or reverse rotation of the spindle at any one of four different speeds by means of the control lever 146 and knob 204. Therefore it is not necessary to specifically set forth what transpires in operative steps 4, 5 and 6, it being recalled that the machine for illustrative purposes is shown as capable of performing an operative cycle comprising six steps.

Assuming that the sixth step has been completed and the slide has been moved rearwardly to turret indexing position to index the turret to bring the No. 1 face thereof into position to start the next operative cycle, the operator may then move the control lever 146 to "Off" position, opening switches MS—2, MS—4, MS—5 and momentarily opening and then closing switch MS—8. This movement of the control lever also causes switches MS—1 and MS—3 to close while switches MS—6 in the High speed position and MS—7 in the Brake position of the circuit remain open. The closing of switch MS—3 maintains coil L energized while the closing of switch MS—1 at this time has no effect due to the holding circuit through contact UV. The opening of switch MS—2 renders wire 303 a dead line and consequently all portions of the control circuit connected to 303 are now dead, thus the opening of switches MS—4 and MS—5 is simply an idle opening movement while the switch MS—6 which remains open is in a dead circuit. Assuming that the operator since the first step has turned spindle positioning knob 203 to "Off" position to open switch SP, then the closing of switch MS—8 in series with switch SP will have no effect in the Spindle Positioning circuit.

When the motor was operating in the low forward speed at which time switch MS—2 was closed, coil R of the reverse contactor in wire 257 was not energized since normally closed contact F—4 in said wire was open. When the motor was operating at low speed in the forward direction relay coil FR was energized and consequently contact FR—2 was closed, thus completing the circuit in wire 319 of the plugging switch circuit. The rotation of the motor in the forward direction at low working speed caused the movable contact arm of the plugging switch PLS to engage the terminal F of said switch and thus connect wires 318 and 319 with the result that relay coil RR became energized and effected closing of contact RR—2 in wire 319. Consequently when switch MS—2 was opened and coils F and FR became deenergized and contact FR in wire 257 closed, reverse contactor coil R in said wire immediately became energized closing contacts R—1, R—2 and R—3 of the reverse contactor 267 and since the contacts L—1, L—2 and L—3 of low speed contactor 272 remain closed, the motor will be energized in the reverse direction to plug the forward coasting rotation thereof. At this time contact RR—1 in the Brake circuit is closed and hence brake solenoid B is energized and the brake is released. As soon as the forward coasting rotation of the motor has been sufficiently slowed down by the plugging action of the plugging switch the movable contact arm of said switch moves away from Terminal F of the plugging switch and thus the circuit to coils R and RR is interrupted, whereupon the reverse energization of the motor is terminated and contact RR—1 in the Brake circuit opens, deenergizing brake solenoid B and causing the brake to be applied to stop the rotation of the motor and the work spindle in the forward direction.

Assuming that the operator wishes to release the brake before initiating the next cycle of operation for the purpose of manually rotating the work spindle, he moves control lever 146 to release brake position at which time switch MS—7 is closed while the remaining master switches on shaft 149 are opened or remain open. The closing of switch MS—7 energizes brake solenoid B and the brake is released, it being noted that switch MS—7 is in wires 246 and 247 which bypass the contacts FR—1, RR—1 and CR3—4.

The foregoing description illustrates the different modes of operation of the machine under the manual control of the operator. The set-up and operation of the machine for automatic control thereof will now be described.

The operator turns the knob 202 on the panel 145 to "Safe Stop Setup" to open all of the SS switches except switch SS—4. Therefore the control circuits are dropped out by the opening of switch SS—1 while the Brake circuit is completed by the closing of switch SS—4 to energize brake solenoid B and release the brake. At this time the motor 40 cannot be operated and the spindle can be turned freely by hand. The operator by means of the buttons on the plungers of the camming drums in housing 63 sets the plungers in the positions shown in Figs. 14, 15 and 16 to effect automatically the desired operations in the various steps of the cycle. He now moves the control lever 146 into the "Off" position to cause switch MS—1 to close, after which he turns knob 202 to Auto. position to close switches SS—1 and SS—2 in the "On" and "Off" and "High-Low" portions, respectively, of the control circuit, whereupon coil UV is energized and the holding circuit is established through contact UV and around switch MS—1. The turning of knob 202 to Auto. position also opens switches SS—3, SS—4 and SS—5 causing the brake to be applied. He then sets the control lever 146 in either High or Low position to close switch MS—2 and complete the circuit to wire 303. This movement of the control lever also closes switch MS—4 in the Automatic Start portion of the control circuit and MS—8 in the Spindle Positioning portion thereof. The fact that either switch MS—5 or switch MS—6 may be closed at this time does not affect the control circuit, since they are in series with switch SS—3 which is open in the "Auto." position.

Assuming that the work piece to be machined is of finished outside diameter and is cut to length and is mounted in the spindle by means of a loading fixture and it is desired to effect a turning cut in the first step to finish a shoulder on the piece, a turning and chamfering cut in the second step to finish an outside diameter that will later be threaded, a drilling and chamfering cut in the third step, a right hand tapping cut in the fourth step and a left hand threading of the outside body in the fifth step and the unloading of the finished work piece and loading of one finished work piece in the sixth step, the buttons in the housing 63 will be positioned as shown in Figs. 14, 15 and 16 and previously described.

Assuming a work piece is correctly positioned in the spindle and that the slide is in its rearmost position and the turret has been indexed to position 1, it will be noted that disks 108 for the first step of drums 103 have actuated the buttons of switches LS4 and LS10, the actuation of switch LS10 in the back gear circuit opens the contacts of said switch in wire 308 and closes its contacts in wire 306, wherefore solenoid 115 is deenergized and solenoid 114 is energized causing the shiftable clutch element 48 to be connected to the gear 45 and hence the drive to the spindle is through the gears 45 and 47. The actuation of limit switch LS4 opens the contacts in wire 328 of the high speed circuit and closes its contacts in wire 274 of the low speed circuit. The closing of the contacts of switch LS4 in wire 274 energizes low speed contactor coil L through wire 325 since switch LS2 in said wire is closed at this time and contact CR1—7 is normally closed. Contacts L—1, L—2 and L—3 in the power circuit are closed and interlock contact L—4 in the high speed control circuit is opened. Thus the circuits are conditioned for initiating low speed operation of the motor. Since No. 1 plunger 118 of the drum 105 is in the retracted position limit switches LS7 and LS2 were not actuated when the drum was indexed to the first position and hence are in their normal positions as shown in the forward and reverse position and in the automatic reverse portion of the control circuit.

The No. 1 plunger 129 of drum 106 is in the fully retracted position and the indexing of the drum to No. 1 position did not affect normally closed switch LS6. The operator now moves the slide forwardly by the turnstile and during this movement limit switch LS5 is momentarily closed as the dog 89 carried by the slide rides over and depresses its switch button. This completes the circuit through coil CR2, it being remembered that switch LS4 has also been closed. The energization of coil CR2 closes contact CR2—1 in the wire 310 of the forward and reverse portion and contact CR2—2 which seals the coil CR2 into the circuit so that the reopening of LS5 does not cause said coil to be deenergized. The closing of contact CR2—1 in wire 310 energizes the forward contactor coil F, since limit switches LS7 and LS1 and contact CR1—1 in wire 259 are closed while contacts CR4 and CR4—1 are closed in wire 260. Also at this time relay coil FR is energized closing contact FR1 in the brake circuit, energizing brake solenoid 13 and releasing the brake. The energization of contactor coil F causes contacts F1, F2 and F3 of said contactor in the power circuit to close while interlock contact F4 in wire 257 of the reverse control circuit is opened. The motor is now running in the forward direction at low motor speed and the drive to the spindle is through the gears 45 and 47. The operator continues the forward movement of the slide to engage the tool with the work piece and perform the turning cut to finish the shoulder on the work piece. When the stop screw 64 corresponding to the first operative step of the cycle engages the movable stop member 65 and depresses the rod 63 until said stop member is against the fixed abutment, switch LS3 is actuated but this does not produce any effect in the control circuit as switch LS2 is open. The operator now moves the slide rearwardly and during the course of this movement switch LS5 is momentarily closed and then opened but this does not affect the circuit to coil CR2, due to the holding circuit through contacts CR2—2. When the slide reaches its rearmost position the turret indexes from position 1 to position 2. This indexing movement causes the contacts of switch LS10 in wire 305 to open and the contacts thereof in wire 308 to close, thus deenergizing solenoid 114 and energizing solenoid 115 of the back gear circuit resulting in movable clutch member 48 being engaged with gear 44, wherefore the drive to the spindle will be through the slow speed gears 44 and 46. The indexing movement of drum 103 also results in the contacts of switch LS4 in the low speed circuit opening and the contacts thereof in the high speed circuit closing, thus changing the motor speed from low to high motor speed. The indexing of drum 105 from No. 1 position to No. 2 position did not affect switches LS2 and LS7 since No. 2 plunger 118 is in the fully retracted position. Likewise the indexing of drum 106 from No. 1 to No. 2 position did not affect switch LS6 and the latter remains closed since plunger 129 for the No. 2 position is in the fully retracted position. The spindle is now running at high motor speed and the drive is through the slow speed gears. The operator moves the slide forwardly by the turnstile and during such movement switch LS5 is momentarily closed by the dog on the slide but due to the holding circuit around said switch this is simply an idle closing thereof. The operator continues the forward movement of the slide to engage the tool with the work to produce the turning and chamfering cut on the outside diameter thereof that is later to be threaded.

The stop screw 64 for the second operative step engages the movable stop member 65 near the end of the machining operation so that said member is moved into engagement with the fixed abutment to positively arrest forward movement of the slide at the end of the machining operation. Again switch LS3 is actuated but since switch LS2 is open no effect occurs in the circuit. The operator now moves the turnstile to effect rearward movement of the slide to indexing position during which switch LS5 is again momentarily closed. When the slide is in its rearmost position the turret indexes from position 2 to position 3. The indexing of the drum 103 effects no change in switches LS4 and LS10, since plunger 109 for position 3 is in the fully retracted position. Hence the motor continues to operate at high speed while the drive to the spindie is through the slow gears 44 and 46. The indexing of drum 105 from position 2 to position 3 does not affect switches LS2 and LS7, since No. 3 plunger 118 is in the fully retracted position. Hence the motor is operating in the forward direction. Similarly the indexing of drum 106 from No. 2 position to No. 3 position does not affect switch LS6 as No. 3 plunger 129 is fully retracted and hence said switch remains closed. The operator now moves the slide forwardly during which switch LS5 is momentarily closed and brings the tool into contact with the work to drill and chamfer the hole therein. The forward movement of the slide is continued until it is positively arrested by the engagement of the No. 3 stop screw 64 with the movable stop member 65 contacting the fixed abutment 67, whereupon the operator rotates the turnstile to move the slide rearwardly during which rearward movement switch LS5 is again momentarily closed. When the slide is in its rearmost position the turret indexes from No. 3 position to No. 4 position and both drums 103 and drums 105 and 106 automatically index from No. 3 to No. 4 position. The indexing of both drums 103 to No. 4 position actuates switches LS4 and LS10, since No. 4 plunger 109 is in extended position. The actuation of switch LS10 opens its contacts in wire 308 and closes its contacts in wires 305 and 306, thus deenergizing solenoid 115 and energizing solenoid 114 in the back gear circuit resulting in the drive to the spindle being through fast gears 45 and 47. The actuation of switch LS4 opens its contacts in wire 280 of the high speed circuit and closes its contacts in wire 274 of the low speed circuit, thus deenergizing coil H and energizing coil L causing contact H6 in wire 275 to close and energizing coil L, causing contact L4 in wire 273 to open. The energization of coil L also causes contacts L1, L2 and L3 in the power circuit to close while the deenergization of coil H causes contacts H1, H2, H3, H4 and H5 to open. Hence the motor is operating at low speed and the drive to the spindle is through the fast gears. The indexing of drum 105 to position 4 causes switch LS2 to be closed, since No. 4 plunger 118 is in the partially extended position. However, at this time the closing of LS2 does not affect the circuit since LS3 in the automatic reverse portion is open. LS7 is not actuated by the indexing of drum 105 into position 4 and hence the contacts of this switch in wire 259 remain closed and its contacts in wire 314 remain open, with the result that the motor continues to operate in the forward direction. The indexing of drum 106 into position 4 brings about no change in switch LS6 since No. 4 plunger 129 is fully retracted and hence said switch remains closed. The operator moves the slide forwardly during this low motor speed at fast gear operation of the spindle and causes the tap to enter the hole in the work and tap the latter in the right hand direction. It will be understood that when the tap has entered the work the operator turns the turnstile at a rate to cause the slide to follow the tap. Near the end of the tapping of the hole the stop screw 64 for the fourth step engages the movable stop member 65 and moves said member and the plunger 66 until switch LS3 is actuated. The point at which switch LS3 will be actuated depends on whether thumb lever 85 is positioned in the early or late position. The actuation of switch LS3 closes said switch and since switch LS2 is not closed coil CR1 in the automatic reverse circuit is energized and contacts CR1—5 are closed establishing a holding circuit around LS3. The energization of CR1 opens contacts CR1—1 in wire 259, closes contacts CR1—2 in wire 268 and opens contacts CR1—3 and closes contact CR1—4 in wire 313, thus since contacts of switch LS7 in wire 259 are closed, coil F in the forward circuit is deenergized, closing interlock contact F4 in the reverse circuit and coil R in the latter circuit is now energized and opens interlock contact R—4 in the forward circuit. The motor is now operating in the reverse direction, since the forward contacts in the power circuit were opened and the reverse contacts were closed the instant that switch LS3 was actuated. The tap now backs out of the work while the operator moves the slide rearwardly to follow the backing off movement. As soon as the tap is free of the work the operator can move the slide to its rearmost position to cause the turret and the drums to index from position 4 into position 5. Since No. 5 plungers 109 of both drums 103 are in the same position as No. 4 plungers the indexing of said drums to position 5 did not change the condition of switches LS4 and LS10 and hence the motor continues to operate at low motor speed and the drive to the spindle is through the fast gears. The No. 5 plunger 118 of drum 105 is in the fully extended position and the raised portion 120a of its cam 120 extends radially, therefore, the indexing of the drum from position 4 to position 5 causes the pin 126 to ride off of No. 4 cam to momentarily open switch LS2, thus braking the holding circuit around switch LS3 and deenergizing coil CR1. When the drum 105 is indexed to No. 5 position the pin 126 comes to rest on the raised portion of the No. 5 cam 120 with both switches LS2 and LS7 being actuated. Therefore in the No. 5 position switch LS2 is again closed while the contacts of switch LS7 in wire 259 are opened and the contacts thereof in wire 314 are closed. It being recalled that coil CR1 is now deenergized due to the momentary opening of LS2, contacts CR1—3 are closed and contacts CR1—4 in wire 313 are opened. Therefore, since contacts of switch LS7 in wire 314 are now closed coil R remains energized and the motor continues to operate in the reverse direction. The indexing of drum 106 from No. 4 position to No. 5 position does not change switch LS6, since No. 5 plunger is fully retracted and therefore said switch remains closed. Hence the motor is now operating at low motor speed in the reverse direction and the drive to the spindle is through the fast gears. The operator moves the slide forwardly until the die is engaged with the work and commences to cut the outside left hand threads thereon. The operator turns the turnstile to cause the slide to follow the die. Since the No. 5 stop screw 64 engages the movable stop member 65 and moves said member and the plunger 66 to actuate switch LS3 the rotation of the motor is reversed and the motor immediately operates in the forward direction. Therefore the die backs off from the work in the right hand direction and the operator moves the slide rearwardly to follow the die.

It will be understood that the actuation of switch LS3 again energizes coil CR1, establishing a holding circuit through contacts CR1—5. The energization of CR1 coil causes contacts CR1—3 to close and contacts CR1—4 to open, resulting in deenergization of coil R and closing of interlock contact R4 in wire 260 and energization of coil F and opening of interlock contact F4 in wire 251. Thus the forward contacts in the power circuit are closed and the reverse contacts therein are opened. When the slide reaches its rearmost position the turret and the drums automatically index to No. 6 position. The No. 6 plungers 109 of drums 103 are fully retracted and hence in the No. 6 step switches LS4 and LS10 are in their normal positions as indicated on the diagram of Fig. 32. The No. 6 plunger 118 of drum 105 is fully retracted and hence in the No. 6 step switches LS2 and LS7 are in their normal positions as indicated in the diagram. The No. 6 plunger 129 of drum 106 is fully extended and is turned so that the cam 134 thereof has its long dimension extending parallel to the direction of the indexing movement and projects to the right of the plunger as viewed in Fig. 16. Thus the indexing of drum 106 to No. 6 position causes the button of switch LS6 to ride up the inclined surface 136 and onto the high surface 139 of the cam with a resultant depression of the button and an opening of switch LS6. Due to the long dimension of the cam being in the direction of the indexing movement the switch button remains in contact with the high surface of the cam and switch LS6 is held open throughout the sixth step and hence the motor 40 cannot be energized during this step and the spindle is not rotated. The operator positions a new work piece in the loading fixture held on No. 6 face of the turret, removes the finished work piece from the spindle and then moves the slide forwardly to position the new work piece centrally of the spindle and he then secures the work piece in such position. After this has been done the operator moves the slide rearwardly to cause it to index from No. 6 position to No. 1 position to repeat the operative cycle.

Assuming that occasion arises wherein it is desired to operate the machine using a single face only of the turret, this can be accomplished by swinging the arm 96 from inactive dotted line position of Fig. 4a up into the full line position of Figs. 4 and 4a. Further assuming that No. 1 plungers of drums 103 and 105 remain as shown in Figs. 14 and 15 while No. 1 plunger of drum 106 is retracted so that switch LS6 remains closed during single face operation of the machine, the operator moves the slide forwardly momentarily closing LS5 and establishing the circuit to CR2 coil and the holding circuit around LS5, thus closing contact CR2—1 in wire 310 of the Forward and Reverse portion. Inasmuch as No. 1 plungers of drums 103 and 105 are as shown in Figs. 14 and 15 and as explained for the automatic operation, the motor will now be operating in the forward direction at low speed and the drive from the motor will be through fast gears 45 and 47. The operator continues the forward motion of the slide to engage the tool with the work and until No. 1 stop screw engages the abutment to stop such forward movement, whereupon he moves the slide rearwardly until the plate which carries lug 89 contacts the raised arm 96 and moves said arm and the plunger 93 against the action of the spring 97 to actuate switch LS11 and open the contacts thereof in wire 322 in Auto. Start portion, thus deenergizing coil CR2, opening contacts CR2—1 and stopping the motor. The arm 96 is moved by the plate until it positively contacts the casting forming the housing 87 and thus a positive stop is provided preventing rearward movement of the slide to indexing position. The operator then removes the finished work piece and loads a new work piece in the chuck after which he moves the slide forwardly and the first portion of this movement allows the spring 97 to move the plunger 93 and arm 96 to their normal positions, thus allowing switch LS11 to return to its normal position with its contacts closed, wherefore since LS5 is momentarily closed by the forward movement of the slide coil CR2 is again energized and contacts CR2—1 are closed to again start the motor in operation.

It will be understood that the No. 1 buttons of the drums 103 and 105 can be placed in various other positions to obtain desired motor operations when using the machine for single face operation.

From the foregoing detailed description of an embodiment of the invention it will be seen that the objects enumerated are fully accomplished by the machine.

Although a preferred embodiment of the invention has been illustrated and described herein it will be understood that the invention is susceptible of various modifications and adaptations within the scope of the appended claims.

Having thus described my invention, I claim:

1. In a machine tool, a support, a rotatable spindle and a slide having forward and rearward movements relative thereto and both carried by said support, an indexible member carried by said slide, said spindle and said member being adapted to carry work and tools, a power drive for rotating said spindle; a control for starting and stopping said power drive and including an electrical control circuit having a start and stop circuit portion, a support carried stop and start control switch in said start and stop circuit portion for effecting the starting and stopping of said power drive, cooperating means on said slide and support for actuating said switch at a predetermined point in the movements of the slide, a slide carried start and stop control switch in said start and stop circuit portion in series with said support carried start and stop control switch, an indexible element having means to actuate said slide carried start and stop control switch selectively in correlation to the different operative steps of the work cycle, operative connections between said indexible member and said element for indexing said element in correlation to the indexing movement of said member, and a manually actuated switch carried by said support and in said start and stop circuit portion in series with said support carried switch and said slide carried switch.

2. In a machine tool, a support including a headstock mounting a rotatable spindle and a base mounting a slide which has forward and rearward movements relative to said spindle, an indexible member carried by said slide, said spindle and said member being adapted to carry work and tools, a power drive for rotating said spindle; a control for starting and stopping said power drive and including an electrical control circuit having a start and stop circuit portion, a base carried automatically operated start and stop control switch in said start and stop circuit portion for effecting the starting and stopping of said power drive, cooperating means on said slide and base for actuating said switch at a predetermined point in the movements of the slide, a slide carried start and stop control switch in said start and stop circuit portion in series with said support carried switch, an indexible element having means to actuate said slide carried switch selectively in correlation to the different operative steps of the work cycle, operative connections between said indexible member and said element for indexing said element in correlation to the indexing movement of said member, a manually actuated switch carried by said headstock and in said start and stop circuit portion in series with said support carried switch and said slide carried switch, and a control lever for actuating said headstock carried switch.

3. In a machine tool, a support, a rotatable spindle and a slide having forward and rearward movements relative thereto and both carried by said support, an indexible member carried by said slide, said spindle and said member being adapted to carry work and tools, a power drive for rotating said spindle; a control for said drive including an electrical control circuit having a start and stop circuit portion, a support carried automatically actuated start and stop control switch in said start and stop circuit portion for starting and stopping the rotation of said spindle, cooperating means on said slide and said support for actuating said switch at a predetermined point in the movements of the slide, a slide carried start and stop control switch in said start and stop circuit portion in series with said support carried start and stop control switch, actuating means for said slide carried start and stop control switch and including an indexible element provided with a plurality of switch actuating members corresponding in number to the operative steps of the work cycle and presettable to either an active or an inactive postion, operative connections between said indexible member and said indexible element for indexing said element in correlation to the indexing movement of said indexible member, and a manually actuated switch carried by said support and in said start and stop circuit portion and in series with said support carried automatically actuated switch and said slide carried switch.

4. In a machine tool, a support, a rotatable spindle and a slide having forward and rearward movements relative thereto and both carried by said support, a member carried by said slide and indexible when said slide is in its rearmost position, said spindle and said member being adapted to carry work and tools, a power drive for rotating said spindle, a control for starting and stopping said power drive and including an electrical control circuit having a start and stop circuit portion, a support carried normally open automatically actuated start and stop control switch in said start and stop circuit portion for effecting the starting and stopping of said power drive, cooperating means on said slide and support for actuating said switch automatically at a predetermined point in the forward and rearward movements of the slide, a slide carried normally closed start and stop control switch in said start and stop circuit portion in series with said support carried start and stop control switch, an indexible element having means to actuate said slide carried start and stop control switch selectively in correlation to the different operative steps of the work cycle, operative connections between said indexible member and said element for indexing said element in correlation to the indexing movement of said member, a second and normally closed support carried switch in said start and stop circuit portion in series with said first named support carried switch and said slide carried switch, cooperating means carried by said slide and said support for opening said second support carried switch during the rearward movement of said slide and for positively arresting rearward movement of the slide in advance of its rearmost position, said cooperating means being positionable in either an active or an inactive position, and means for closing said second named support carried switch upon forward movement of said slide.

5. In a machine tool, a support, a rotatable spindle and a slide having forward and rearward movements relative thereto and both carried by said support, said spindle and said slide being adapted to carry work and tools, a power drive for rotating said spindle, a control for starting and stopping said power drive and including an electrical control circuit having a start and stop circuit portion, a support carried normally open start and stop control switch in said start and stop circuit portion for effecting the starting and stopping of said power drive, cooperating means on said slide and support for momentarily closing said switch at a predetermined point in the forward and rearward movements of said slide, means in said start and stop circuit portion for establishing a holding circuit around said switch each time it is momentarily closed, a support carried normally closed switch in said start and stop circuit portion in series with said first named switch and said holding circuit, cooperating means carried by said support and said slide for opening said normally closed switch during rearward movement of said slide to interrupt said holding circuit and stop said power drive, said cooperating means being positionable in either an active or an inactive position, and means effective during forward movement of said slide to close said normally closed switch and condition the start and stop circuit portion so that the momentary closing of said support carried normally open switch completes the circuit and causes the holding circuit to be again established.

6. In a machine tool, a support, a rotatable spindle and a slide having forward and rearward movements relative thereto and both carried by said support, a member carried by said slide and indexible when said slide is in its rearmost position, said spindle and said member being adapted to carry work and tools, a power drive for rotating said spindle, a control for starting and stopping said power drive and including an electrical control circuit having a start and stop circuit portion, a support carried normally open start and stop control switch in said start and stop circuit portion for effecting the starting and stopping of said power drive, cooperating means on said slide and support for momentarily closing said switch at a predetermined point in the forward and rearward movements of said slide, means in said start and stop circuit portion for establishing a holding circuit around said switch when it is momentarily closed, a normally closed slide carried start and stop control switch in said start and stop circuit portion in series with said support carried start and stop control switch and which when opened prevents the establishment of said holding circuit upon momentary closure of said support carried switch, actuating means for said slide carried switch and including an indexible element provided with a plurality of actuating members corresponding in number to the operative steps of the work cycle and presettable to either an active or an inactive position, operative connections between said indexible member and said element for indexing said element in correlation to the indexing movement of said indexible member, another normally closed switch in said start and stop circuit portion in series with both of said first named switches, cooperating means carried by said support and said slide for opening said last named normally closed switch during rearward movement of said slide to interrupt said holding circuit and stop said power drive, said cooperating means also acting to positively stop rearward movement of said slide before said member is indexed and being positionable in either an active or an inactive position, and means effective during forward movement of said slide to close said last named normally closed switch and condition the start and stop circuit portion so that the momentary closing of said support carried switch completes the start and stop circuit portion and causes the holding circuit to be again established.

7. In a machine tool, a support, a rotatable spindle and a slide having forward and rearward movements relative thereto and both carried by said support, said spindle and said slide being adapted to carry work and tools, a power drive for rotating said spindle, a control for starting and stopping said power drive and including an electrical control circuit having a start and stop circuit portion, a support carried normally open start and stop control switch in said start and stop circuit portion for effecting the starting and stopping of said power drive, cooperating means on said slide and support for momentarily closing said switch at a predetermined point in the forward and rearward movements of said slide, means in said start and stop circuit portion for establishing a holding circuit around said switch each time it is momentarily closed, a normally closed switch in said start and stop circuit portion in series with said first named switch and said holding circuit, cooperating means carried by said support and said slide for opening said normally closed switch during rearward movement of said slide to interrupt said holding circuit and stop said power drive, said cooperating means being positionable in either an active or an inactive position, means effective during forward movement of said slide to close said normally closed switch and condition the start and stop circuit portion so that the momentary closing of said support carried switch completes the start and stop circuit portion and causes the holding circuit to be again established, and a manually controlled switch carried by said support and in said start and stop circuit portion and in series with both of said previously mentioned switches.

8. In a machine tool, a support, a rotatable spindle and a slide having feeding and idle movements relative thereto and both carried by said support, an indexible member carried by said slide, said spindle and said member being adapted to carry work and tools, a power drive for rotating said spindle in opposite directions, an electrical control for said drive including a control circuit having a direction control circuit portion, a support carried direction control switch in said direction control circuit portion for effecting change in direction of rotation of said spindle, cooperating means on said slide and said support for actuating said switch at a predetermined point in the feeding movement of the slide, a normally open slide carried direction control switch in said direction control circuit portion in series with said support carred direction control switch, a two position slide carried direction control switch in the direction control circuit portion, an indexible element having means to actuate said normally open slide carried direction control switch or both of said slide carried direction control switches in correlation to the different operative steps of the work cycle, and operative connections between said indexible member and said indexible element for indexing said element in correlation to the indexing movement of said member.

9. In a machine tool, a support, a rotatable spindle and a slide having feeding and idle movements relative thereto and both carried by said support, an indexible member carried by said slide, said spindle and said member being adapted to carry work and tools, a power drive for rotating said spindle in opposite directions, an electrical control for said drive including a control circuit having a direction control circuit portion, a two position slide carried direction control switch in said direction control circuit portion for effecting change in the direction of rotation of said spindle and normally positioned for forward rotation thereof and having forward and reverse contacts, a normally open slide carried direction control switch in said direction control circuit portion, a normally open support carried direction control switch in said direction control circuit portion in series with said normally open slide carried switch, cooperating means on said slide and support for momentarily closing said normally open support carried switch at a predetermined point in the feeding movements of the slide, means in said direction control circuit portion for establishing a holding circuit around said support carried switch when momentarily closed provided said normally open slide carried switch is closed, an indexible element having means to close said normally open slide carried switch or both of said slide carried switches in correlation to the different operative steps of the work cycle, wherefore closure of said normally open slide carried switch when said two position slide carried switch is in its normal condition effects change of direction from forward to reverse while closure thereof when said two position switch is in its second position effects change of direction from reverse to forward, and operative connections between said indexible member and said indexible element for indexing said element in correlation to the indexing movement of said member.

10. A machine tool as defined in claim 9, and wherein a manually actuated two position switch is included in said direction control circuit portion with both contacts thereof in series with the forward contacts of said slide carried two position switch, the contacts of said manually actuated switch which are normally closed being in the forward circuit and the other contacts thereof being in the reverse circuit, wherefore when said normally open slide carried switch remains open and said two position slide carried switch is in its normal position said manually actuated two position switch can be actuated to control the direction of rotation of said spindle.

11. In a machine tool, a support, a rotatable spindle and a slide having feeding and idle movements relative thereto and both carried by said support, an indexible member carried by said slide, said spindle and said member being adapted to carry work and tools, a multiple speed power drive for rotating said spindle in opposite directions, an electrical control for said drive including a control circuit having a direction control circuit portion and a speed control circuit portion, a support carried direction control switch in said direction control circuit portion for effecting change in direction of rotation of said spindle, cooperating means on said slide and said support for actuating said switch at a predetermined point in the feeding movement of the slide, a slide carried direction control switch in said direction control circuit portion in series with said support carried direction control switch, an indexible element having means to actuate said slide carried direction control switch in correlation to the different operative steps of the work cycle, operative connections between said indexible member and said indexible element for indexing said element in correlation to the indexing movement of said member, and means in said speed control circuit portion for increasing the speed of said power drive when the direction thereof is changed by actuation of said direction control switches and including a manually actuated two position switch normally positioned to maintain the speed constant upon reversal of direction.

12. In a machine tool, a support, a rotatable spindle and a slide both carried by said support, an indexible member carried by said slide, said spindle and said member being adapted to carry work and tools, a multispeed power drive for rotating said spindle at different speeds in opposite directions, an electrical control for said drive including a control circuit having a direction control circuit portion and a speed control circuit portion, a support carried direction control switch in said circuit control circuit portion for effecting change in direction of rotation of said spindle, cooperating means on said slide and said support for actuating said switch at a predetermined point in the movement of the slide, a slide carried direction control switch in said direction control circuit portion in series with said support carried direction control switch, a slide carried speed control switch in said speed control circuit portion, actuating means for said slide carried switches and including indexible elements corresponding in number to said slide carried switches and having means to actuate said slide carried switches selectively in correlation to the different operative steps of the work cycle, operative connections between said indexible member and said indexible elements for indexing said elements in correlation to the indexing movement of said member, and means in said speed control circuit portion and adapted to function when said speed control switch is set for low speed to cause a higher speed rotation of said spindle when the direction of rotation thereof is reversed by said direction control switches and including a manually actuated two position switch.

13. In a machine tool, a support, a rotatable spindle and a slide both carried by said support, an indexible member carried by said slide, said spindle and said member being adapted to carry work and tools, a multispeed power source, a driving connection between said power source and said spindle and including a change speed drive, an electrical control for said power source and said drive including a control circuit having a speed control circuit portion and a change speed drive control circuit portion, a slide carried speed control switch for said power source and in said speed control circuit portion, a slide carried change speed control switch for said change speed drive and in said change speed drive control circuit portion, actuating means for both of said slide carried switches and including indexible elements corresponding in number to said switches and each having means to actuate a respective switch selectively in correlation to the different operative steps of the work cycle, and operative connections between said indexible member and said indexible elements for indexing said elements in correlation to the indexing movement of said member.

14. In a machine tool, a support, a rotatable spindle carried thereby, an electric motor for driving said spindle at a plurality of working speeds or at a constant non-work prebraking speed, means for braking the movement of said spindle, a slide carried by said support and having forward and rearward movements relative to said spindle, an indexible member carried by said slide, said spindle and said member being adapted to carry work and tools, a control for said motor and said braking means and including an electrical control circuit having a motor speed control circuit portion, a brake control circuit portion and a spindle positioning circuit portion, a normally closed slide carried switch in said motor speed control circuit portion and controlling the working operation of said motor, an indexible element having means to actuate said slide carried switch to selectively open the same in correlation to the different operative steps of the work cycle to terminate operation of said motor at a working speed, operative connections between said indexible member and said element for indexing said element in correlation to the indexing movement of said member, said control including means in said brake control circuit portion for holding said braking means inactive during the operation of said motor at working speeds, means in said motor speed control circuit portion for causing said motor to operate at a non-working speed when the working speed thereof is terminated, and means acting to render said motor inoperative and terminate said non-working operation thereof and apply said braking means to stop said spindle in a predetermined position.

15. A machine tool as defined in claim 14 and wherein the means which act to render the motor inoperative and terminate the non-working operation thereof and apply the braking means to stop the spindle in a predetermined position includes a cam ring on said spindle, a switch fixed to said support and in said spindle positioning circuit portion, and operative connections between said cam ring and said switch for actuating the latter.

ROBERT H. CLARK.

REFERENCES CITED

The following references are of record in the file of this patent:

UNITED STATES PATENTS

| Number | Name | Date |
|---|---|---|
| 2,255,739 | Curtis | Sept. 9, 1941 |
| 2,376,552 | Nelson et al. | May 22, 1945 |
| 2,405,686 | Clark | Aug. 13, 1946 |